(12) United States Patent
Esser-Kahn et al.

(10) Patent No.: US 10,865,306 B2
(45) Date of Patent: *Dec. 15, 2020

(54) THERMALLY DEGRADABLE POLYMERIC FIBERS

(71) Applicant: The Board of Trustees of the University of Illinois, Urbana, IL (US)

(72) Inventors: Aaron P. Esser-Kahn, Champaign, IL (US); Hefei Dong, Urbana, IL (US); Piyush R. Thakre, Lake Jackson, TX (US); Jason F. Patrick, Urbana, IL (US); Nancy R. Sottos, Champaign, IL (US); Jeffrey S. Moore, Savoy, IL (US); Scott R. White, Champaign, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 363 days.

This patent is subject to a terminal disclaimer.

(21) Appl. No.: 15/960,076

(22) Filed: Apr. 23, 2018

(65) Prior Publication Data
US 2018/0362757 A1 Dec. 20, 2018

Related U.S. Application Data

(60) Continuation of application No. 14/606,553, filed on Jan. 27, 2015, now Pat. No. 9,951,221, which is a
(Continued)

(51) Int. Cl.
*C08L 67/04* (2006.01)
*B32B 3/20* (2006.01)
(Continued)

(52) U.S. Cl.
CPC ............ *C08L 67/04* (2013.01); *B29C 48/023* (2019.02); *B29C 48/05* (2019.02); *B29C 67/202* (2013.01);
(Continued)

(58) Field of Classification Search
CPC ................. B29C 67/202; D01D 5/06
See application file for complete search history.

(56) References Cited

U.S. PATENT DOCUMENTS 3,533,753 A * 10/1970 Berger ................. B01J 23/8986
502/324
5,085,252 A 2/1992 Mohamed et al.
(Continued)

FOREIGN PATENT DOCUMENTS

CN 101376093 B 3/2009
EP 2805732 A1 11/2014
(Continued)

OTHER PUBLICATIONS

Bogdanovich et al., "Three-Dimensional Reinforcements for Composites", Sampe J., 45(6):8-28, Nov. 2009.
(Continued)

*Primary Examiner* — Galen H Hauth
(74) *Attorney, Agent, or Firm* — Haukaas Fortius PLLC; Michael H. Haukaas

(57) ABSTRACT

A microvascular system includes a solid polymeric matrix and a woven structure in the matrix. The woven structure includes a plurality of fibers, and a plurality of microfluidic channels, where at least a portion of the microfluidic channels are interconnected. The microvascular system may be made by forming a composite that includes a solid polymeric matrix and a plurality of sacrificial fibers in the matrix, heating the composite to a temperature of from 100 to 250° C., maintaining the composite at a temperature of from 100 to 250° C. for a time sufficient to form degradants from the sacrificial fibers, and removing the degradants from the composite. The sacrificial fibers may include a polymeric fiber matrix including a poly(hydroxyalkanoate) and a metal selected from the group consisting of an alkali earth metal
(Continued)

and a transition metal, in the fiber matrix, where the concentration of the metal in the fiber matrix is at least 0.1 wt %.

20 Claims, 20 Drawing Sheets

Related U.S. Application Data division of application No. 13/416,002, filed on Mar. 9, 2012, now abandoned.

(60) Provisional application No. 61/451,698, filed on Mar. 11, 2011.

(51) Int. Cl.

| | | |
|---|---|---|
| *D02G 3/04* | (2006.01) | |
| *B29C 67/20* | (2006.01) | |
| *D01F 1/10* | (2006.01) | |
| *B29C 48/05* | (2019.01) | |
| *B29C 48/00* | (2019.01) | |
| *D01D 5/06* | (2006.01) | |

(52) U.S. Cl.
CPC ............... *B32B 3/20* (2013.01); *D01D 5/06* (2013.01); *D01F 1/10* (2013.01); *D02G 3/04* (2013.01); *D10B 2331/041* (2013.01); *Y10T 428/249978* (2015.04); *Y10T 428/2958* (2015.01)

(56) References Cited

U.S. PATENT DOCUMENTS

| | | | |
|---|---|---|---|
| 5,465,760 A | 11/1995 | Mohamed et al. | |
| 5,490,602 A * | 2/1996 | Wilson | B29C 70/22 216/56 |
| 6,283,168 B1 | 9/2001 | Gu et al. | |
| 6,315,007 B1 | 11/2001 | Mohamed et al. | |
| 6,345,598 B1 | 2/2002 | Bogdanovich et al. | |
| 6,439,096 B1 | 8/2002 | Mungalov et al. | |
| 6,447,886 B1 | 9/2002 | Mohamed et al. | |
| 6,521,148 B2 | 2/2003 | Qiu et al. | |
| 6,555,488 B1 | 4/2003 | Qiu et al. | |
| 6,766,817 B2 | 7/2004 | Silva | |
| 7,007,710 B2 | 3/2006 | Heller et al. | |
| 7,202,325 B2 | 4/2007 | Pacetti et al. | |
| 7,377,752 B2 | 5/2008 | Mohamed | |
| 7,569,625 B2 | 8/2009 | Keller et al. | |
| 7,611,997 B2 | 11/2009 | Wigent | |
| 7,628,179 B2 | 12/2009 | Mohamed | |
| 7,732,086 B2 | 6/2010 | Morse et al. | |
| 9,464,118 B2 | 10/2016 | Willbold et al. | |
| 9,951,221 B2 * | 4/2018 | Esser-Kahn | B32B 3/20 |
| 2001/0014565 A1 | 8/2001 | Qiu et al. | |
| 2002/0112961 A1 | 8/2002 | O'Connor et al. | |
| 2003/0119398 A1 | 6/2003 | Bogdanovich et al. | |
| 2004/0195733 A1 * | 10/2004 | Maccagnan | C04B 35/82 264/610 |
| 2004/0226620 A1 | 11/2004 | Therriault et al. | |
| 2005/0146076 A1 | 7/2005 | Alexander et al. | |
| 2005/0186081 A1 | 8/2005 | Mohamed | |
| 2006/0022130 A1 | 2/2006 | Bousse et al. | |
| 2006/0057209 A1 | 3/2006 | Chapman et al. | |
| 2007/0087198 A1 | 4/2007 | Dry | |
| 2007/0189902 A1 | 8/2007 | Mohamed | |
| 2008/0003433 A1 | 1/2008 | Mikami | |
| 2008/0290550 A1 * | 11/2008 | Da Cunha | D01F 6/30 264/180 |
| 2008/0305343 A1 | 12/2008 | Toohey et al. | |
| 2009/0025544 A1 | 1/2009 | Mohamed | |
| 2009/0191402 A1 | 7/2009 | Beiermann et al. | |
| 2010/0043908 A1 | 2/2010 | Mohamed | |
| 2013/0065042 A1 | 3/2013 | Esser-Kahn et al. | |

FOREIGN PATENT DOCUMENTS

| | | |
|---|---|---|
| JP | 2003311697 A | 11/2003 |
| WO | 0125138 A1 | 4/2001 |
| WO | 2004005336 A2 | 1/2004 |
| WO | 2007005657 A3 | 11/2007 |
| WO | 2010003188 A1 | 1/2010 |
| WO | 2010009320 | 3/2010 |
| WO | 2010062570 A2 | 6/2010 |

OTHER PUBLICATIONS

Cam et al., "Influence of Residual Monomers and Metals on Poly (L-Lactide) Thermal Stability," Polymer, 38 (8):1879-1884, Apr. 1997.
Fan et al., "Thermal Degradation of Poly(L-Lactide): Effect of Alkali Earth Metal Oxides for Selective L,L-Lactide Formation," Polymer, 45(4):1197-1205, Feb. 2004.
Gupta et al., "Poly(lactic acid) Fiber: An Overview," Prog. Polym. Sci., 32(4):455-482, Apr. 2007.
Hansen et al., "Self-Healing Materials with Interpenetrating Microvascular Networks," Adv Mater., 21(41):4143-4147, Nov. 2009.
Hawley's, "Alkaline-earth Metals," Hawley's Condensed Chemical Dictionary, John Wiley & Sons, Inc., Published Online Mar. 2007.
Hawley's, "Transition Element," Hawley's Condensed Chemical Dictionary, John Wiley & Sons, Inc., Published Online Mar. 2007.
Pang et al., "A Hollow Fibre Reinforced Polymer Composite Encompassing Self-Healing and Enhanced Damage Visibility," Compos Sci Technol., 65(11-12):1791-1799, Sep. 2005.
Stig et al. "Assessment of the Mechanical Properties of a New 3D Woven Fibre Composite Material," Compos Sci Technol., 69(11-12):1686-1692, Sep. 2009.
Therriault et al., "Chaotic Mixing in Three-Dimensional Microvascular Networks Fabricated by Direct-Write Assembly," Nat Mater., 2:265-271, May 2003.
Toohey et al., "Delivery of Two-Part Self-Healing Chemistry via Microvascular Networks," Adv Funct Mater., 19 (9):1399-1405, May 2009.
Toohey et al., "Self-Healing Materials with Microvascular Networks," Nat Mater., 6(8):581-585, Aug. 2007.
Von Richter, Text-Book of Inorganic Chemistry, 5th American from the 10th German ed., P. Blakiston's Son & Co., Philadelphia, PA., 1900, pp. 300.
Findeis et al., "Modified-Peptide Inhibitors of Amyloid â-Peptide Polymerization," Biochemistry, 38(21):6791-6800, May 1999.
Kayed et al., "Common Structure of Soluble Amyloid Oligomers Implies Common Mechanism of Pathogenesis," Science, 300(5618):486-489, Apr. 2003.
Song et al., "Multivalent Macromolecules Redirect Nucleation-Dependent Fibrillar Assembly into Discrete Nanostructures," J Am Chem Soc., 136(14):5233-5236, Apr. 2014.
Soto et al., "Inhibition of Alzheimer's Amyloidosis by Peptides that Prevent b-Sheet Conformation," Biochem. Biophys. Res. Commun., 226(3):672-680, Sep. 1996.
Viet et al., "Inhibition of Aggregation of Amyloid Peptides by Beta-Sheet Breaker Peptides and Their Binding Affinity," J Phys Chem B., 115(22):7433-7446, Jun. 2011.

* cited by examiner

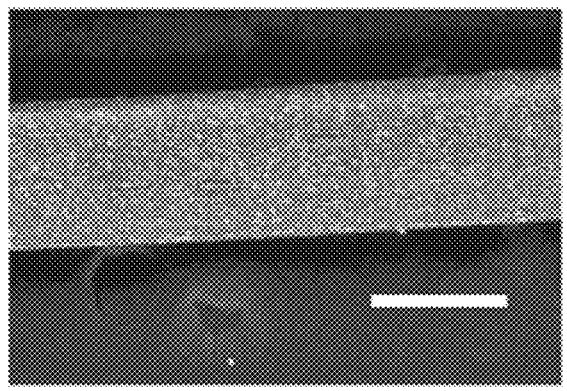 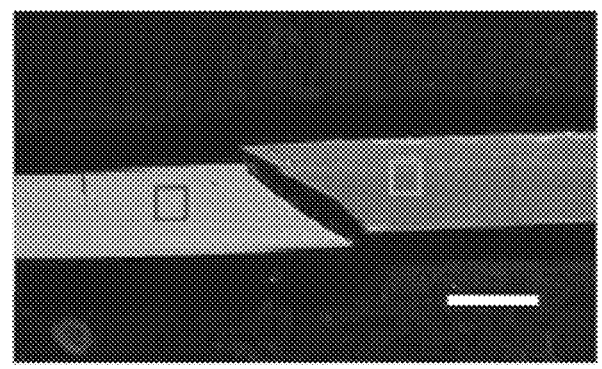
FIG. 22A                FIG. 22B
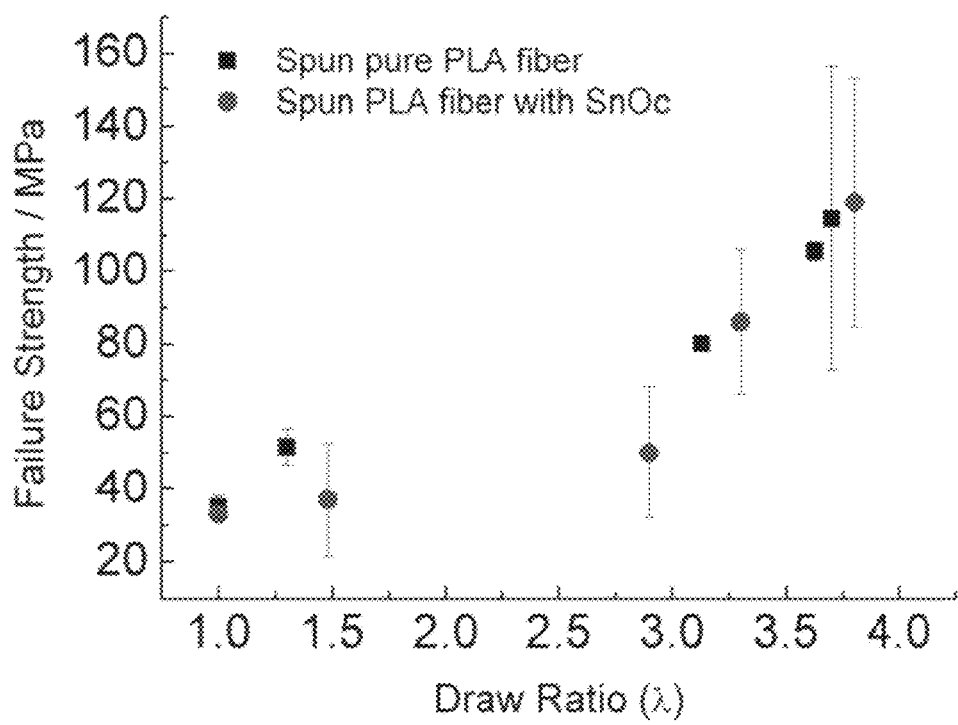
FIG. 23

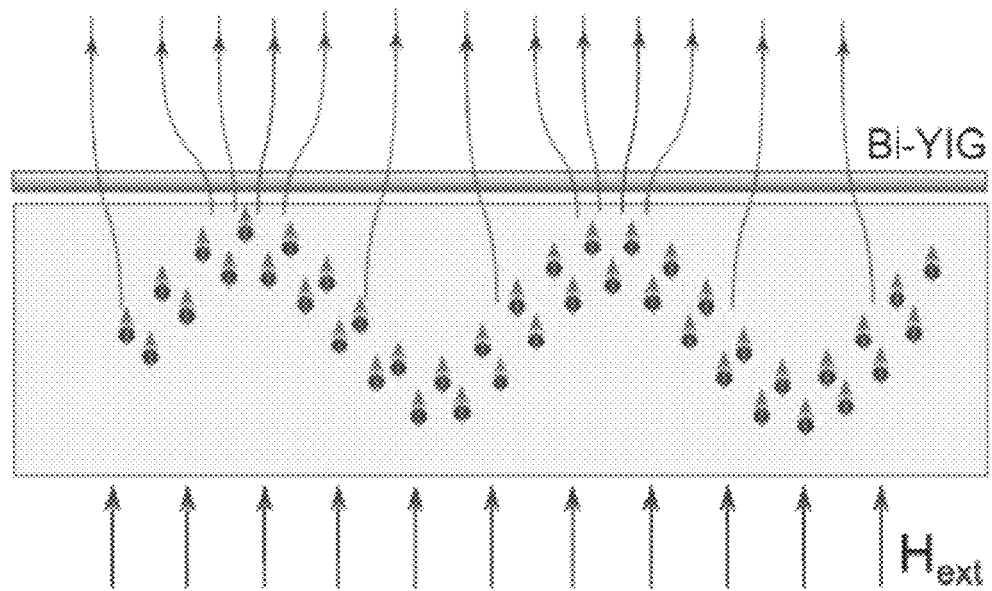
FIG. 30
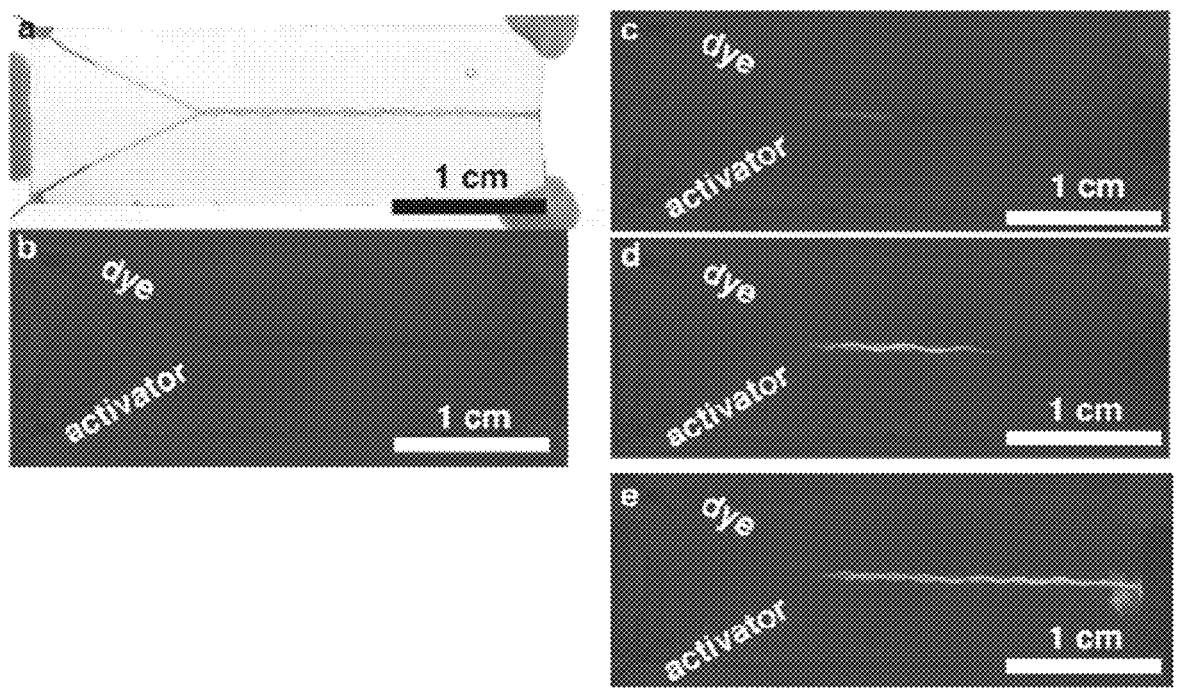
FIG. 31A-E

THERMALLY DEGRADABLE POLYMERIC FIBERS

REFERENCE TO RELATED APPLICATIONS

This application is a continuation of U.S. application Ser. No. 14/606,553, filed Jan. 27, 2015, issued as U.S. Pat. No. 9,951,221 on Apr. 24, 2018, which is a divisional of U.S. application Ser. No. 13/416,002, filed Mar. 9, 2012, which application claims priority under 35 U.S.C. § 119(e) to U.S. Provisional Application No. 61/451,698, filed Mar. 11, 2011, which applications are incorporated by reference in their entirety.

FEDERALLY SPONSORED RESEARCH OR DEVELOPMENT

This invention was made with government support under contract number(s) FA9550-05-1-0346, FA9550-09-1-0686, FA9550-10-1-0255 and 2008ST-061-ED002, awarded by the Air Force Office of Research and the OFA/Department of Homeland Security. The government has certain rights in the invention.

BACKGROUND

Synthetic composite materials possess desirably high strength-to-weight ratios; however, composites typically lack dynamic functionality that occurs in natural composite materials. Natural composite materials, for example, rely on pervasive vascular networks to enable a variety of biological functions, in both soft and hard tissue. Composite structures such as bone tissue or wood are lightweight and have high strength, yet contain extensive vasculature capable of transporting mass and energy.

An ongoing challenge in materials science is the development of microvascular networks in synthetic composites, where the composite materials may be formed using conventional composite manufacturing processes. Specialized fabrication methods such as laser-micromachining, soft lithography, templating with degradable sugar fibers, and incorporating hollow glass or polymeric fibers can produce some microvascular structures in composite materials These specialized methods, however, are not currently suitable for rapid, large-scale production of fiber-reinforced composites with complex vasculatures.

In one approach to microfluidic composites, relatively short microfluidic channels are provided in a matrix in the form of hollow glass fibers (WO 2007/005657 to Dry). The glass fibers are present as repair conduits containing a fluid that can heal a crack in the composite matrix. A significant limitation of this approach is the brittle nature of the hollow glass fibers, which limits the shapes and lengths of microfluidic channels that can be present in the composite. In addition, the glass fibers cannot readily be used to form a microfluidic network.

In another approach to microfluidic composites, microfluidic channels are formed in a polymeric matrix by arranging hollow polymeric fibers and then forming the matrix around the hollow polymeric fibers (U.S. Publication No. 2008/0003433 to Mikami). Hollow polymeric fibers may offer a wider variety of microfluidic channel shapes than those available from hollow glass fibers. This approach, however, also has a number of limitations, including an inability to form a network from the individual hollow fibers, the relatively small number of materials available as hollow fibers, and the possibility of incompatibility between the hollow fiber and the matrix and/or between the hollow fiber and substances introduced into the channels.

Microfluidic networks can be formed in a polymeric matrix using a three-dimensional (3-D) direct-write assembly technique (U.S. Publication No. 2008/0305343 to Toohey et al.). While this fabrication method provides excellent spatial control, the resulting networks typically will not survive the mechanical and/or thermal stresses encountered in the conventional processes of forming reinforced composites.

It is desirable to provide microvascular networks in synthetic composites, where the composite materials may be formed using conventional composite manufacturing processes. It is desirable for the microfluidic channels of the networks to be available in a variety of shapes and dimensions. It also is desirable for a variety of polymeric materials to be available as the polymeric matrix of such a composite.

SUMMARY

In one aspect, the invention provides a microvascular system that includes a solid polymeric matrix and a woven structure in the matrix. The woven structure includes a plurality of fibers, and a plurality of microfluidic channels, where at least a portion of the microfluidic channels are interconnected.

In another aspect of the invention, there is a method of making a microvascular system including forming a composite that includes a solid polymeric matrix and a plurality of sacrificial fibers in the matrix, heating the composite to a temperature of from 100 to 250° C., maintaining the composite at a temperature of from 100 to 250° C. for a time sufficient to form degradants from the sacrificial fibers, and removing the degradants from the composite to provide a network of microfluidic channels. The degradants have an average molecular weight less than 500 Daltons.

In another aspect of the invention, there is a method of making a microvascular system including forming a composite that includes a solid polymeric matrix and a woven structure in the matrix, heating the composite to a temperature of from 100 to 250° C., maintaining the composite at a temperature of from 100 to 250° C., for a time sufficient to form degradants from the sacrificial fibers, and removing the degradants from the composite to provide a plurality of microfluidic channels. The woven structure includes a plurality of fibers and a plurality of sacrificial fibers. The degradants have an average molecular weight less than 500 Daltons.

In another aspect of the invention, there is a thermally degradable polymeric fiber that includes a polymeric fiber matrix including a poly(hydroxyalkanoate) and a metal selected from the group consisting of an alkali earth metal and a transition metal, in the fiber matrix. The concentration of the metal in the fiber matrix is at least 0.1 wt %.

In another aspect of the invention, there is a method of making a degradable polymeric fiber including combining a fiber that includes a poly(hydroxyalkanoate) and a composition that includes a fluorinated fluid and a metal selected from the group consisting of an alkali earth metal and a transition metal. The method further includes maintaining the fiber and the composition together at a temperature and for a time sufficient to provide a concentration of the metal in the fiber of at least 0.1 wt %, and separating the fiber and the fluorinated fluid.

In another aspect of the invention, there is a method of making a degradable polymeric fiber including forming a spinning liquid that includes a poly(hydroxyalkanoate), a solvent, and a metal selected from the group consisting of an alkali earth metal and a transition metal. The method further includes passing the spinning liquid through a spinneret to form a fiber containing the poly(hydroxyalkanoate) and the metal; and drying the fiber to provide a concentration of the metal in the fiber of at least 0.1 wt %.

To provide a clear and more consistent understanding of the specification and claims of this application, the following definitions are provided.

The term "polymeric" means a substance that includes a polymer.

The term "polymer" means a substance containing more than 100 repeat units. The term "polymer" includes soluble and/or fusible molecules having long chains of repeat units, and also includes insoluble and infusible networks. The term "prepolymer" means a substance containing less than 100 repeat units and that can undergo further reaction to form a polymer.

The term "matrix" means a continuous phase in a material.

The term "matrix precursor" means a composition that will form a polymer matrix when it is solidified. A matrix precursor may include a monomer and/or prepolymer that can polymerize to form a solid polymer matrix. A matrix precursor may include a polymer that is dissolved or dispersed in a solvent, and that can form a solid polymer matrix when the solvent is removed. A matrix precursor may include a polymer at a temperature above its melt temperature, and that can form a solid polymer matrix when cooled to a temperature below its melt temperature.

The term "woven structure" means a single ply of an assembly of threads, where the threads are oriented in at least 2 directions within the ply.

The term "microfluidic channel" means a substantially tubular structure having a diameter less than 1,000 micrometers.

The term "microfluidic network" means a plurality of channels having a plurality of interconnects, where at least a portion the channels have a dimension less than 1,000 micrometers.

The term "fluid communication" means that two objects are in an orientation, and within a sufficient proximity to each other, such that fluid can flow from one object to the other. The term "fluid" means a substance in the liquid or gaseous state. In one example, if a microfluidic channel embedded in a matrix is in fluid communication with a surface of the matrix, then fluid can flow from the channel onto the surface.

BRIEF DESCRIPTION OF THE DRAWINGS

The invention can be better understood with reference to the following drawings and description. The components in the figures are not necessarily to scale and are not intended to accurately represent molecules or their interactions, emphasis instead being placed upon illustrating the principles of the invention. Moreover, in the figures, like referenced numerals designate corresponding parts throughout the different views.

FIGS. 22A and 22B depict scanning electron microscopy (SEM) images of PLA fibers containing tin(II) oxalate (22A), tin(II) octoate (22B, left) and of pure PLA fiber (22B, right).

FIG. 23 depicts a graph of failure strengths in megapascals (MPa) as a function of draw ratio of PLA fibers subjected to cold drawing.

FIG. 30 depicts a schematic illustration of an inhomogeneous magnetic flux emanating from a 3D microvascular composite.

FIGS. 31A-31E depict micrographs of a vascularized construct of two intertwined fibers forming a Y-shape.

DETAILED DESCRIPTION

In accordance with the present invention a microvascular system includes a solid polymeric matrix and a woven structure in the matrix. The woven structure includes a plurality of fibers and a plurality of microfluidic channels. At least a portion of the microfluidic channels are interconnected. Such reinforced microvascular composites can enable materials systems with unprecedented applications, and can be designed to contain a variety of microvascular network types and sizes—from simple, straight conduits to complex, computer-controlled 3D woven architectures. The reinforced microvascular composites may be formed from commercially available materials, and may be integrated seamlessly with conventional fiber-reinforced composite manufacturing methods.

In accordance with the present invention a microvascular system may be formed from composite materials containing sacrificial fibers and optionally containing reinforcing fibers. Sacrificial fibers may be used to form biomimetic material systems in a reliable manner, and may be used to model, reproduce and/or extend transport functions performed by microvascular systems in nature. Composite materials containing both sacrificial fibers and reinforcing fibers can be used to provide reinforced microvascular composites, such as those described above.

In accordance with the present invention a sacrificial fiber may include a thermally degradable polymeric fiber that degrades at temperatures above those typically used for forming composite materials, but below the typical degradation temperatures of composite materials. A thermally degradable polymeric fiber may include a polymeric fiber matrix and a catalyst in the fiber matrix that lowers the degradation temperature of the matrix polymer to within an appropriate temperature window.

Figure 1:
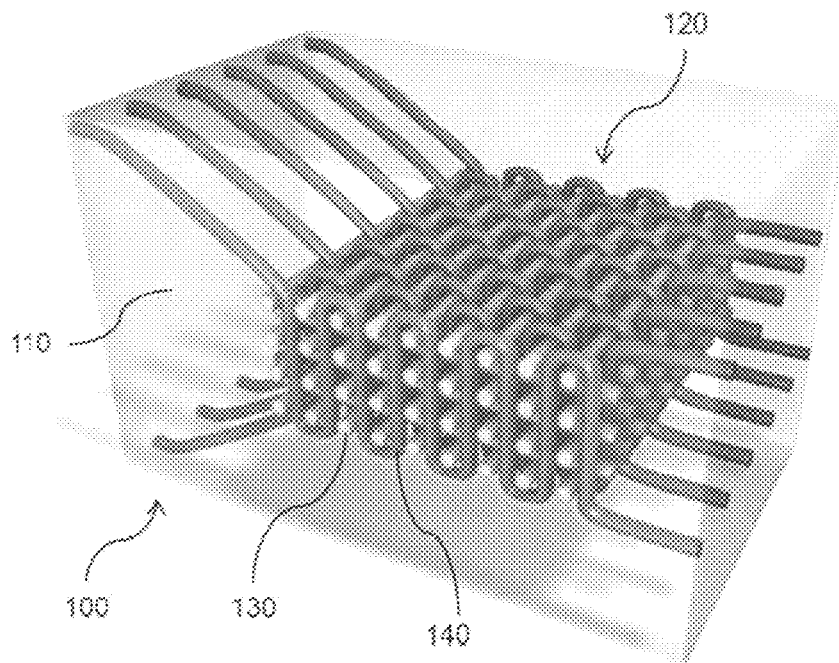
FIG. 1 depicts a schematic representation of a microvascular system.

FIG. 1 depicts a schematic representation of a microvascular system 100, which includes a solid polymeric matrix 110 and a woven structure 120 in the matrix. The woven structure 120 includes at least one ply containing a plurality of fibers 130 and a plurality of microfluidic channels 140. Preferably at least a portion of the microfluidic channels 140 are interconnected.

The solid polymer matrix 110 may include a polyamide such as nylon; a polyester such as poly(ethylene terephthalate) and polycaprolactone; a polycarbonate; a polyether; an epoxy polymer; an epoxy vinyl ester polymer; a polyimide such as polypyromellitimide (for example KAPTAN); a phenol-formaldehyde polymer such as BAKELITE; an amine-formaldehyde polymer such as a melamine polymer; a polysulfone; a polyacrylonitrile-butadiene-styrene) (ABS); a polyurethane; a polyolefin such as polyethylene, polystyrene, polyacrylonitrile, a polyvinyl, polyvinyl chloride and poly(DCPD); a polyacrylate such as polyethyl acrylate); a poly(alkylacrylate) such as poly(methyl methacrylate); a polysilane such as poly(carborane-silane); and a polyphosphazene.

The solid polymer matrix 110 may include an elastomer, such as an elastomeric polymer, an elastomeric copolymer, an elastomeric block copolymer, and an elastomeric polymer blend. Examples of elastomer polymers include polyolefins, polysiloxanes such as poly(dimethylsiloxane) (PDMS), polychloroprene, and polysulfides; examples of copolymer elastomers may include polyolefin copolymers and fluorocarbon elastomers; examples of block copolymer elastomers may include acrylonitrile block copolymers, polystyrene block copolymers, polyolefin block copolymers, polyester block copolymers, polyamide block copolymers, and polyurethane block copolymers; and examples of polymer blend elastomers include mixtures of an elastomer with another polymer. Composite materials that include an elastomer as the solid polymer matrix are disclosed, for example, in U.S. Pat. No. 7,569,625 to Keller et al, and in U.S. Application Publication 2009/0191402 to Beiermann et al, which are incorporated by reference. The solid polymer matrix 110 may include a mixture of these polymers, including copolymers that include repeating units of two or more of these polymers, and/or including blends of two or more of these polymers.

The solid polymer matrix 110 may include other ingredients in addition to the polymeric material. For example, the matrix may contain one or more particulate fillers, stabilizers, antioxidants, flame retardants, plasticizers, colorants and dyes, fragrances, or adhesion promoters. An adhesion promoter is a substance that increases the adhesion between two substances, such as the adhesion between two polymers. One type of adhesion promoter that may be present includes substances that promote adhesion between the solid polymer matrix 110 and the fibers 130.

The woven structure 120 includes at least one ply containing a plurality of fibers 130 and a plurality of microfluidic channels 140. The woven structure 120 may include more than one ply containing fibers and microfluidic channels. The woven structure 120 also may include at least one ply containing a plurality of fibers 130 without any microfluidic channels and/or may include at least one ply containing a plurality of microfluidic channels 140 without any fibers. The fibers 130 may be present as tows, also referred to as yarns, which are assemblies of from 100 to 12,000 individual fibers.

The woven structure 120 may be a two-dimensional (2D) structure, in which the ply includes threads oriented in two different directions in substantially a single plane. The woven structure 120 may be a three-dimensional (3D) structure, in which the ply includes threads oriented in two different directions in substantially a single plane, and further includes threads oriented in a third direction that is substantially orthogonal to the plane. An individual "thread" in the woven structure 120 may be a microfluidic channel 140 or a fiber 130, which may be an individual fiber or a fiber tow.

The fibers 130 may include a material having an aspect ratio (diameter:length) of at least 1:10, including at least 1:100 and at least 1:1,000. The fibers 130 preferably include reinforcing fibers that, when added to a solid polymer matrix, increase the strength of the matrix relative to the pure polymer. Reinforcing fibers may include an inorganic and/or an organic material. Examples of fibrous reinforcing materials include graphite fibers, ceramic fibers, metal fibers, and polymer fibers. Examples of graphite reinforcing fibers include Thornel 25 and Modmor. Examples of ceramic reinforcing fibers include metal oxide fibers such as titanium oxide fibers, zirconium oxide fibers and aluminum oxide fibers; silica fibers; and glass fibers, such as E-glass fibers and S-glass fibers. Examples of metal fibers include steel fibers, tungsten fibers, beryllium fibers, and fibers containing alloys of these metals. Examples of polymer fibers include polyester fibers, nylon fibers, rayon fibers, and polyaramid fibers, such as Kevlar 49.

The microfluidic channels 140 may include substantially tubular channels having a diameter less than 1,000 micrometers. The term "substantially tubular" means that the majority of the cross-sectional periphery of the channel through the substrate matrix is curved in shape. Curved can include circular, elliptic, rounded, arched, parabolic and other curved shapes. The average diameter of the substantially tubular channels preferably is from 0.1 to 1,000 micrometers, more preferably is from 10 to 500 micrometers, and more preferably is from 50 to 250 micrometers. The microfluidic channels 140 may have a length of at least 1 centimeter.

Preferably at least a portion of the microfluidic channels 140 have a plurality of interconnects. Interconnects are present wherever a first portion of a channel contacts a second portion of the channel, or wherever a first channel contacts a second channel. In this manner, interconnects connect the channels at a plurality of locations, thus establishing fluid communication between the channels. Microfluidic channels 140 that are interconnected thus form a microfluidic network.

A fluid in the microfluidic channels 140 can flow through the channel and into another channel by way of an interconnect between the channels. If the polymeric matrix includes an inlet port, a fluid delivered through the inlet port can flow through the interconnected microfluidic channels within the polymeric matrix. If the interconnected microfluidic channels form a network, the introduced fluid may at least partially fill the network.

At least a portion of the microfluidic channels 140 can be independent, existing in the matrix 110 without any interconnect with another channel. In one example, all of the microfluidic channels 140 in a microvascular system 100 are independent, and the system does not include a microfluidic network. In this example, any fluid in an individual microfluidic channel 140 is not in fluid communication with a fluid in another microfluidic channel.

The microfluidic channels 140 may include a fluid, such as a gas or a liquid, or they may include a vacuum. The microvascular system 100 may be referred to as an "apomatrix" when the microfluidic channels 140 include a fluid. Without fluid, or with air, microvascular system 100 may be referred to as a "holomatrix".

The microfluidic channels 140 in the polymeric matrix 110 can affect the structural properties of the matrix, and the type and magnitude of the resulting structural property changes may depend on the properties of the channels and their configuration in the matrix. For example, it may be desirable for the microfluidic channels 140 to have a minimum channel spacing and a maximum channel diameter, which may help to minimize any decrease in the strength of the matrix.

Figure 2:
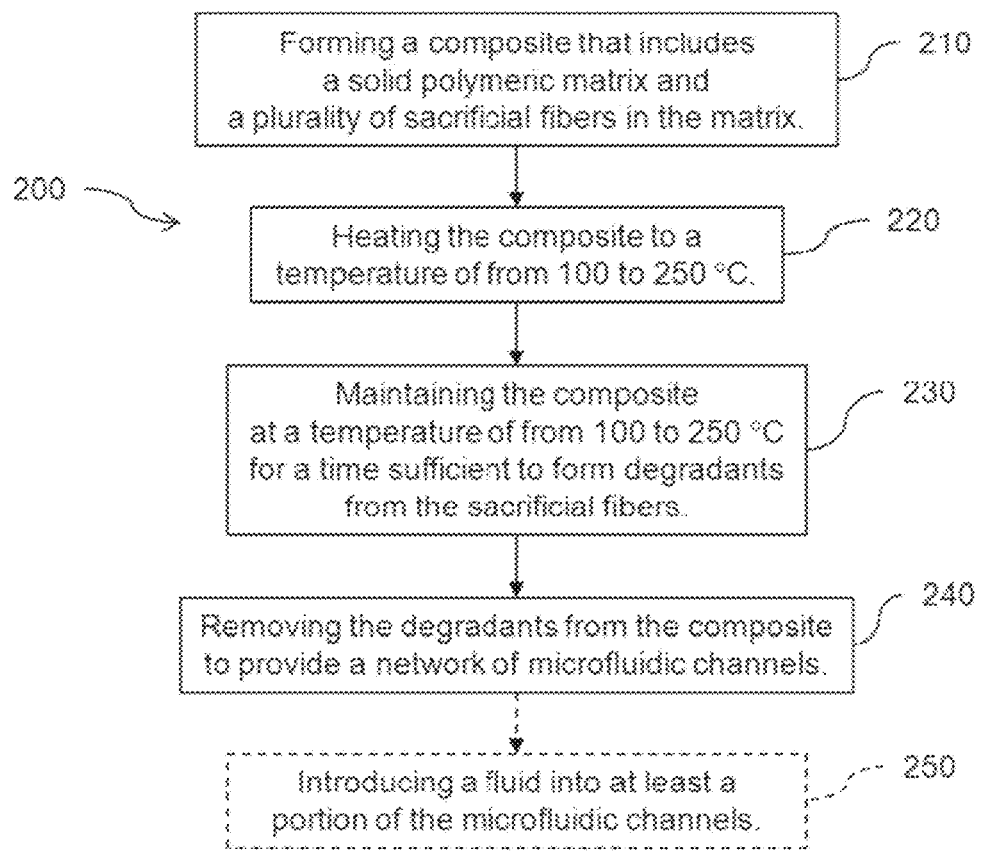
FIG. 2 depicts a method of making a microvascular system.

FIG. 2 illustrates a schematic representation of an example of a method of making a microvascular system. Method 200 includes forming 210 a composite that includes a solid polymeric matrix and a plurality of sacrificial fibers in the matrix, heating 220 the composite to a temperature of from 100 to 250° C., maintaining 230 the composite at a temperature of from 100 to 250° C. for a time sufficient to form degradants from the sacrificial fibers, and removing 240 the degradants from the composite to provide microfluidic channels. Method 200 optionally further includes introducing 250 a fluid into at least a portion of the microfluidic channels.

Forming 210 a composite that includes a solid polymeric matrix and a plurality of sacrificial fibers in the matrix may include combining a matrix precursor with a plurality of sacrificial fibers, and then solidifying the matrix precursor to form a solid polymer matrix. The method may further include forming the sacrificial fibers and/or the matrix precursor.

The matrix precursor may be any substance that can form a solid polymer matrix when solidified. The matrix precursor may be substantially homogeneous, or it may include other substances, such as fillers and/or viscosity modifiers. For example, a matrix precursor may include particles that can change the viscosity of the precursor and/or can change the properties of the polymeric matrix formed from the precursor. Examples of particles that may be present in the matrix precursor include plastic particles and non-plastic particles, such as ceramics, glasses, semiconductors, and metals.

In one example, the matrix precursor includes a monomer and/or prepolymer that can polymerize to form a polymer. The sacrificial fibers and optionally other ingredients may be mixed with the monomer or prepolymer. The matrix precursor may then be solidified by polymerizing the monomer and/or prepolymer of the matrix precursor to form the solid polymer matrix.

Examples of monomers and/or prepolymers that can polymerize to form a polymer include cyclic olefins; unsaturated monomers such as acrylates, alkylacrylates (including methacrylates and ethacrylates), styrenes, isoprene and butadiene; lactones (such as caprolactone); lactams; epoxy-functionalized monomers, prepolymers or polymers; functionalized siloxanes; and two-part precursors for polymers such as polyethers, polyesters, polycarbonates, polyanhydrides, polyamides, formaldehyde polymers (including phenol-formaldehyde, urea-formaldehyde and melamine-formaldehyde), and polyurethanes. Polymerization of a matrix precursor may include crosslinking of monomers and/or prepolymers to form an insoluble polymer network. Crosslinking may be performed by a variety of methods, including the addition of chemical curing agents, exposure to light or other forms of radiation, or heating. If a chemical curing agent is used, it may be added to the matrix precursor before or after it is combined with the sacrificial fibers.

In another example, the matrix precursor includes a polymer in a matrix solvent. The polymer may be dissolved or dispersed in the matrix solvent to form the matrix precursor, and the sacrificial fibers and optionally other ingredients then mixed into the matrix precursor. The matrix precursor may be solidified by removing at least a portion of the matrix solvent from the composition to form the solid polymer matrix.

In another example, the matrix precursor includes a polymer that is at a temperature above its melting temperature. The polymer may be melted to form the matrix precursor and then mixed with the sacrificial fibers and optionally other ingredients. The matrix precursor may be solidified by cooling the composition to a temperature below the melt temperature of the polymer to form the solid polymer matrix.

Forming 210 preferably includes contacting the sacrificial fibers with a matrix precursor a temperature of at least 75° C. In one example, forming 210 includes contacting the sacrificial fibers with a matrix precursor that includes a monomer and/or prepolymer, and heating the matrix precursor and sacrificial fibers to a temperature of at least 75° C., for a time sufficient to polymerize the monomer and/or prepolymer. In another example, forming 210 includes contacting the sacrificial fibers with a matrix precursor that includes a polymer that is at a temperature above its melting temperature, where the melting temperature is less than 75° C.

Heating 220 the composite to a temperature of from 100 to 250° C. and maintaining 230 the composite at a temperature of from 100 to 250° C. for a time sufficient to form degradants from the sacrificial fibers may include, for example, placing the composite in an oven. The degradants preferably have an average molecular weight less than 500 Daltons, and preferably are in a gas phase.

Removing 240 the degradants from the composite may include contacting at least a portion of a surface of the composite with a vacuum source. Removing 240 the degradants from the composite may include contacting at least a portion of a surface of the composite with a pressurized fluid, such as a gas. Use of a pressurized fluid or a vacuum may facilitate removal of gaseous degradants. The composite may be maintained at a temperature of from 100 to 250° C. during the removal, or the temperature of the composite may be raised or lowered prior to or during the removal. Removing 240 the degradants from the composite may occur simultaneously with the heating 220 and/or maintaining 230 of the composite, or the removing may occur after the maintaining 230 of the composite.

Interconnects can be formed between microfluidic channels, such as channels 140 of FIG. 1, wherever a first portion of a sacrificial fiber contacts a second portion of a sacrificial fiber. Interconnects are formed because the matrix precursor does not substantially penetrate an area where fiber contact occurs. The concentration of interconnects in a microvascular composite can be controlled by adjusting the number of contacts between the sacrificial fibers as the polymeric matrix is formed.

Optionally introducing 250 a fluid into at least a portion of the microfluidic channels may include any of a variety of methods for introducing a fluid into a microfluidic channel. In one example, the fluid may be injected into one or more channels. In another example, one or more channel openings may be placed in contact with a reservoir of the fluid. The fluid may then flow through the channels through capillary action.

Figure 3:
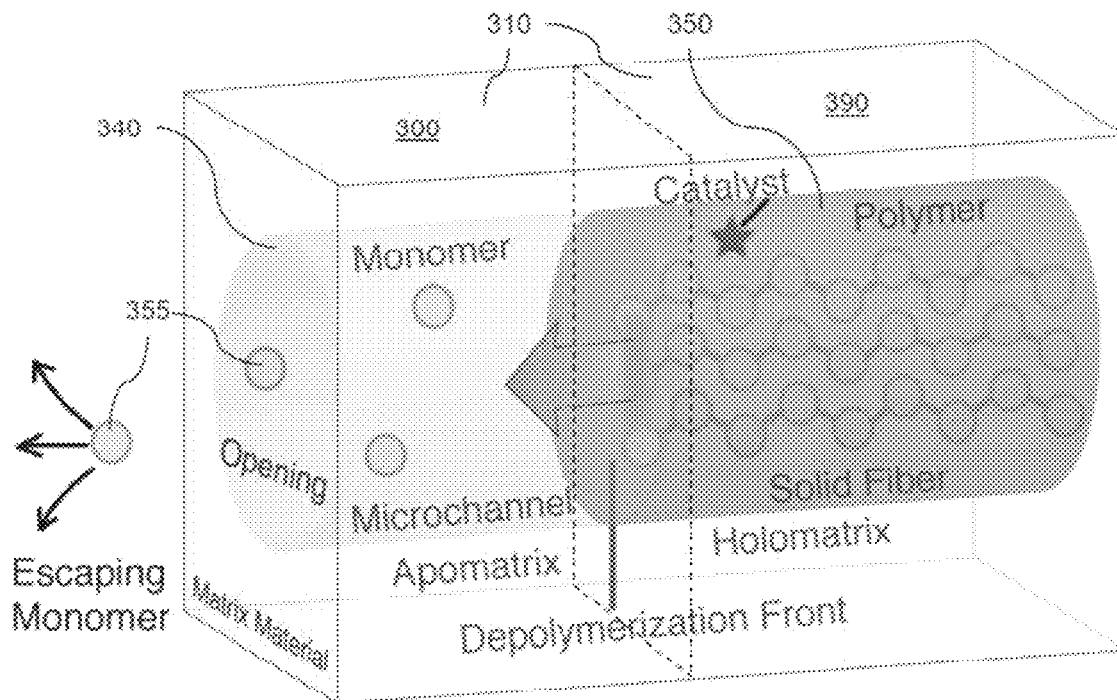
FIG. 3 illustrates a schematic representation of a composite.

FIG. 3 depicts a schematic representation of a composite 390, which includes a solid polymeric matrix 310 and a plurality of sacrificial fibers 350, and of a composite 300, which includes the polymeric matrix 310 and a plurality of microfluidic channels 340. In FIG. 3, the sacrificial fiber 350 of composite 390 is being converted into degradants 355 that are subsequently removed, forming the microfluidic channel 340 of composite 300. Composite 390 may be the product of the forming 210 of method 200 of FIG. 2, for example. Composite 300 may be the product of the heating 220, maintaining 230 and removing 240 of method 200 of FIG. 2, for example.

The solid polymer matrix 310 may include a polymeric material, and may include other ingredients in addition to the polymeric material, as described above for solid polymer matrix 110 of FIG. 1. The microfluidic channels 340 may have the dimensions and configuration as described above for microfluidic channels 140.

The sacrificial fiber 350 should be strong enough to survive a mechanical weaving process to survive being combined with a matrix precursor. The sacrificial fiber 350 also should remain solid during solidification of the matrix precursor into a polymeric matrix. For solidification by polymerization and/or curing, the fiber 350 preferably should remain solid at temperatures up to 180° C. The sacrificial fiber 350 also should be easily removed from a polymeric matrix by degradation to volatile degradants at higher temperatures. The sacrificial fiber 350 also should have degradation and volatilization temperatures within a narrow range between the highest matrix solidification temperatures and the lowest thermal degradation temperatures of the polymeric matrix (200-240° C.). Preferably, the degradation temperature ($T_D$) of the fiber 350 is at most 250° C. More preferably, the $T_D$ of the fiber is at most 220° C., and more preferably is at most 180° C.

Figure 4:
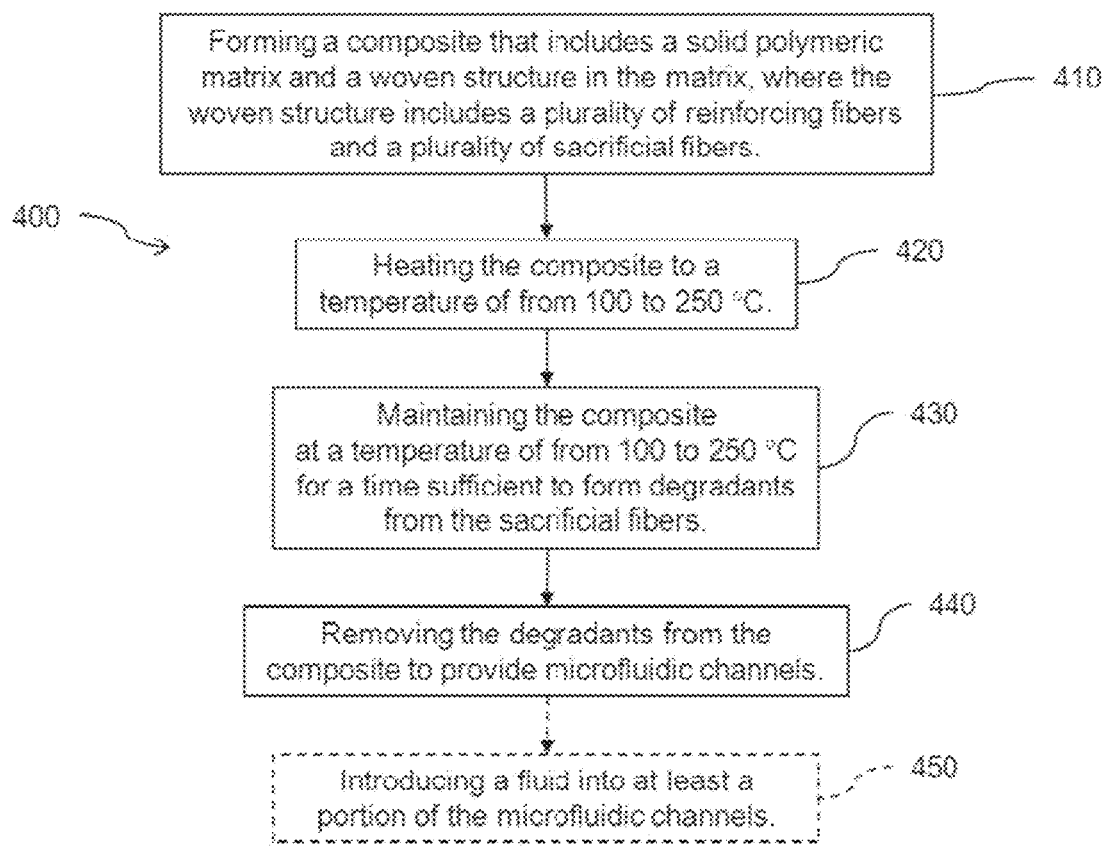
FIG. 4 depicts a method of making a microvascular system.

FIG. 4 illustrates a schematic representation of an example of a method of making a microvascular system, such as microvascular system 100 of FIG. 1. Method 400 includes forming 410 a composite that includes a solid polymeric matrix and a woven structure in the matrix, where the woven structure includes a plurality of reinforcing fibers and a plurality of sacrificial fibers. Method 400 further includes heating 420 the composite to a temperature of from 100 to 250° C., maintaining 430 the composite at a temperature of from 100 to 250° C. for a time sufficient to form degradants from the sacrificial fibers, and removing 440 the degradants from the composite to provide microfluidic channels. The degradants preferably have an average molecular weight less than 500 Daltons. Method 400 optionally further includes introducing 450 a fluid into at least a portion of the microfluidic channels.

Forming 410 a composite that includes a solid polymeric matrix and a woven structure in the matrix may include combining a matrix precursor with a woven structure, and then solidifying the matrix precursor to form a solid polymer matrix. The method may further include forming the woven structure and/or the matrix precursor.

Forming 410 may include forming the woven structure by weaving reinforcing fibers and sacrificial fibers to form a single ply. In one example, an arrangement of warp threads in a first orientation may be held in tension, and weft threads then may be directed sinusoidally in a second orientation through the warp threads. Preferably the second direction is transverse to the first orientation. The warp threads may include reinforcing and/or sacrificial fibers. The weft threads likewise may include reinforcing and/or sacrificial fibers. In this example, the resulting ply is a 2D woven structure.

In another example, an arrangement of warp threads in a first orientation may be held in tension. Weft threads then may be directed in a second orientation over, under and/or through the warp threads, where the second direction preferably is transverse to the first orientation. Z-threads then may be directed through the warp and weft threads, preferably in an orientation that is orthogonal to a plane formed by the weft and warp threads. The Z-threads may be directed through the weft and warp threads sinusoidally. The warp, weft and/or Z-threads may include reinforcing and/or sacrificial fibers. In this example, the resulting ply is a 3D woven structure Forming 410 may include inserting sacrificial fibers into a ply of woven reinforcing fibers. In one example, a sacrificial fiber is stitched into a woven ply of fibers, such as by repeatedly piercing the ply with a needle attached to a sacrificial fiber, and forming a sinusoidal trace of the sacrificial fiber that traverses the thickness of the ply. In this example, a pattern of one or more sacrificial fibers may be formed along the length and width of the woven ply.

Figures 5A, 5B:
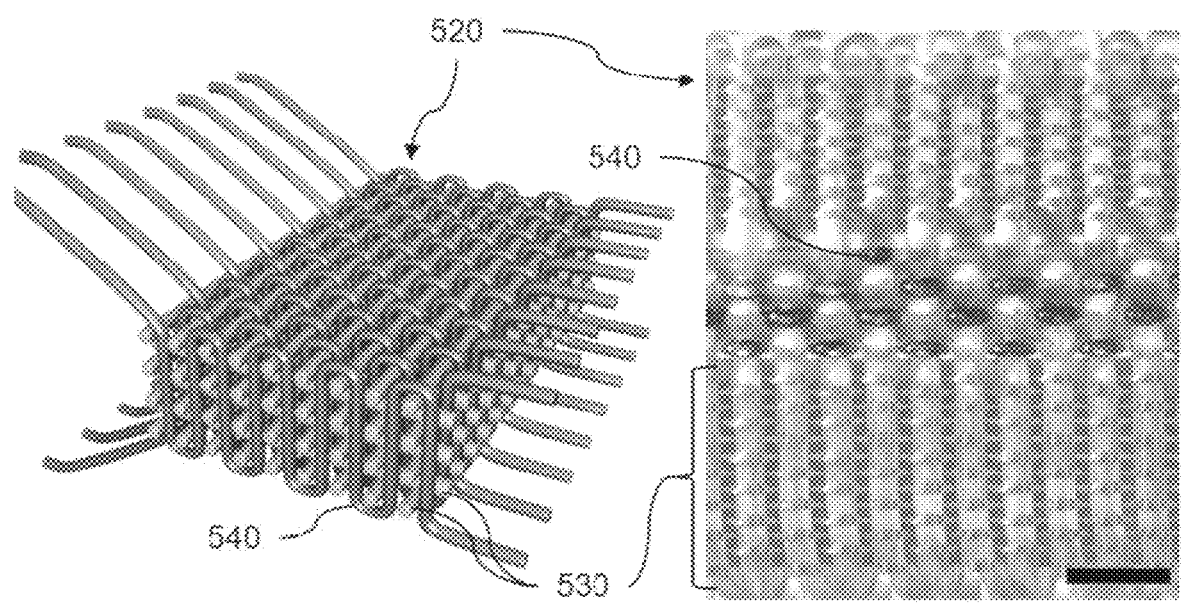
FIGS. 5A-5H are schematic representations (5A, 5C, 5E, 5G) and micrographs (5B, 5D, 5F, 5H) of various stages of formation of a microvascular composite material. The scale bars in micrographs 5B, 5D, 5F and 5H correspond to 5 millimeters (mm).

In one example, sacrificial fibers and reinforcing fibers may be arranged into two- or three-dimensional woven preforms. The position, length, diameter, and curvature of the sacrificial and/or reinforcing fibers may be varied to meet desired design criteria. FIGS. 5A and 5B are a schematic representation and a micrograph, respectively, of a woven structure 520 that includes reinforcing glass fibers 530 and sacrificial fibers 540. The reinforcing fibers 530 are configured as straight warp and weft threads, and the sacrificial fibers 540 are configured as interwoven Z-fiber threads, resulting in an orthogonal 3D woven structure.

Forming 410 includes combining the woven structure and a matrix precursor. The matrix precursor may be as described with regard to forming 210 of FIG. 2. Forming 410 preferably includes contacting the woven structure with a matrix precursor and heating the matrix precursor to a temperature of at least 75° C. for a time sufficient to form the polymeric matrix.

Figures 5C, 5D:
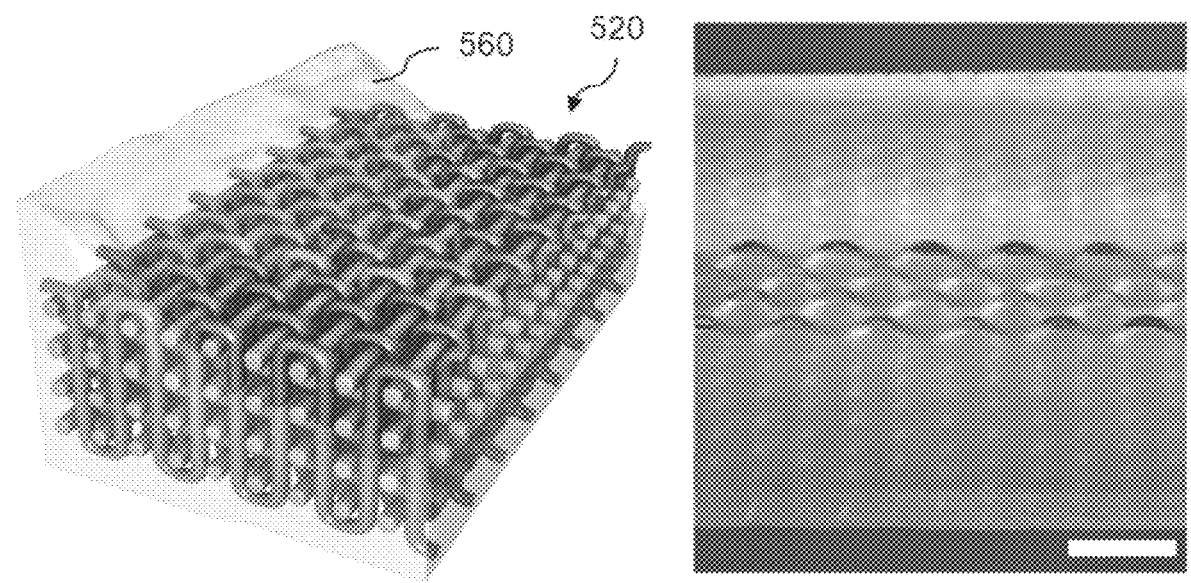

In one example, forming 410 includes infiltrating the interstitial pore space between fibers with a low-viscosity thermosetting resin (e.g. epoxy) and curing at elevated temperature. After curing, the sample may be trimmed to expose the ends of the sacrificial fiber. FIGS. 5C and 5D are a schematic representation and a micrograph, respectively, of woven structure 520 as it is being infused with a polymeric matrix precursor 560 to form a composite material.

Heating 420 the composite to a temperature of from 100 to 250° C. and maintaining 430 the composite at a temperature of from 100 to 250° C. for a time sufficient to form degradants from the sacrificial fibers may include, for example, placing the composite in an oven. The degradants preferably have an average molecular weight less than 500 Daltons, and preferably are in a gas phase. Removing 440 the degradants from the composite may include contacting at least a portion of a surface of the composite with a vacuum source or with a pressurized fluid. The heating 420, maintaining 430 and removing 440 may be as described above for heating 220, maintaining 230 and removing 240 of FIG. 2.

Figures 5E, 5F:
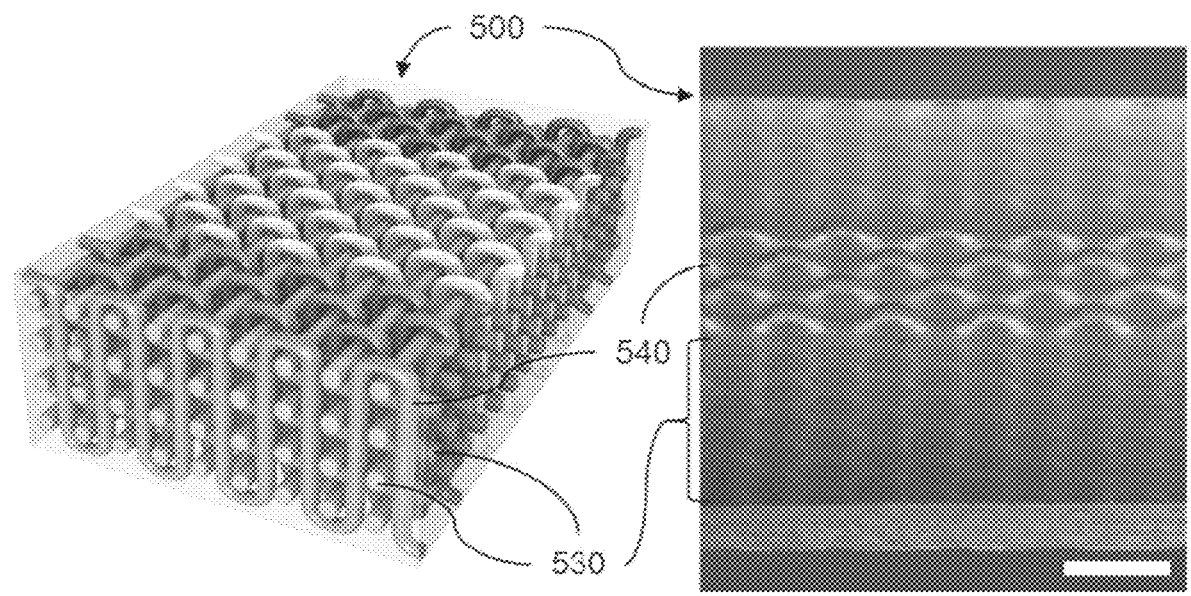

In one example, the heating 420 may be performed above 200° C., and the maintaining 430 and subsequent removing 440 may provide empty channels and a 3D vascular network throughout the composite. FIGS. 5E and 5F are a schematic representation and a micrograph, respectively, of a composite material (holomatrix) 500 that includes the reinforcing fibers 530 of the woven structure, and that includes microvascular channels 540 formed from the sacrificial fibers.

Figures 5G, 5H:
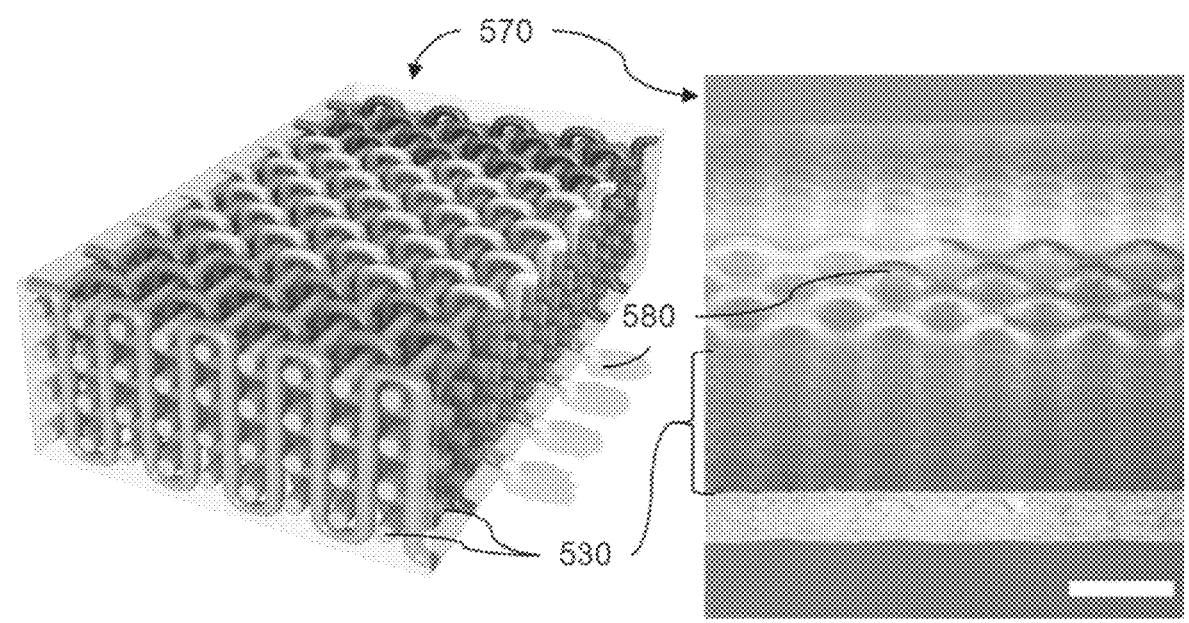

Optionally introducing 450 a fluid into at least a portion of the microfluidic channels may include any of a variety of methods for introducing a fluid into a microfluidic channel, as described above for introducing 250 of FIG. 2. FIGS. 5G and 5H are a schematic representation and a micrograph, respectively, of a composite material (apomatrix) 570 that includes the reinforcing fibers 530 of the woven structure, and that includes a fluid 580 in the microvascular channels. In one example, a microvascular composite is filled with a fluid having the desired physical properties to create a multifunctional material.

The introduction of sacrificial fibers into a woven fiber preform can provide seamless fabrication of microvascular composites that are both strong and multifunctional. Preferably the hollow channels produced in the composites are high-fidelity inverse replicas of the original fibers' diameters and trajectories. Use of methods 200 and 400 has yielded microvascular fiber-reinforced composites with channels over one meter in length that then can be filled with a variety of fluids including aqueous solutions, organic solvents, and liquid metals. By circulating fluids with unique physical properties, a new generation of biphasic composite materials is enabled, in which the solid phase provides strength and form while the liquid phase provides interchangeable functionality.

Methods 200 and 400 are examples of a method referred to as Vaporization of Sacrificial Components (VaSC). The VaSC methods can provide composite materials that include microfluidic channels having a range of channel curvatures and diameters, allowing the construction of a wide variety of network architectures. The methods also can provide composite materials that include microfluidic channels that are interconnected and/or branched. Microchannels ranging in size from 20 to 500 micrometers have been created in epoxy matrices using VaSC methods.

Figure 6:
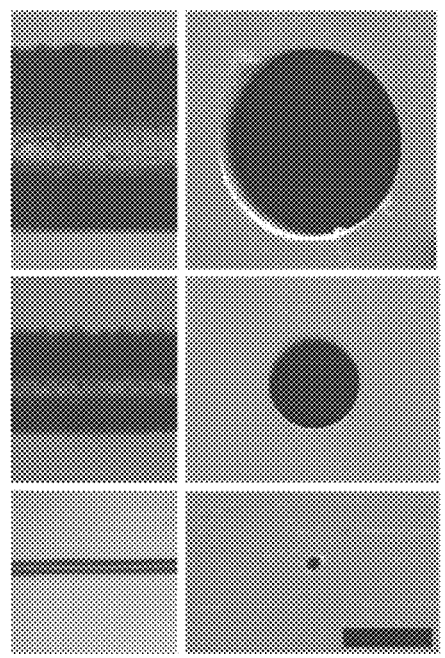
FIG. 6 depicts optical and scanning electron micrographs of cross sections of channels created from sacrificial fibers having various diameters.
Figure 7:
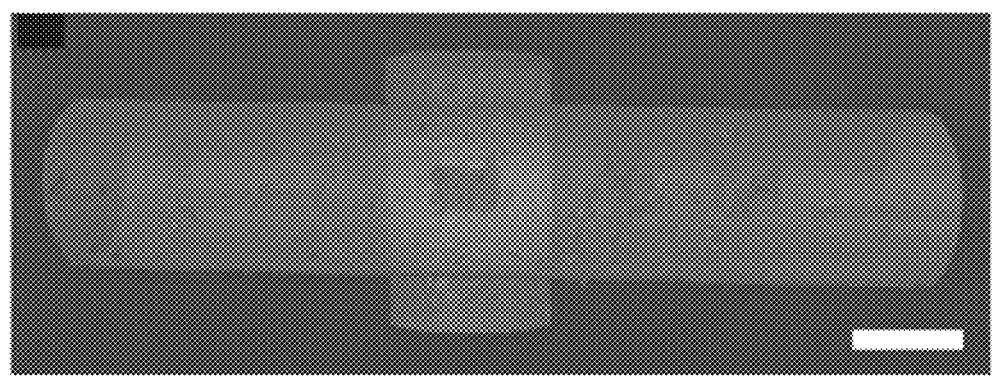
FIG. 7 depicts a microscale X-ray computed tomography (micro-CT) image of a channel interconnect formed at the point of contact between two overlapping 500 micrometer sacrificial fibers.
Figure 8:
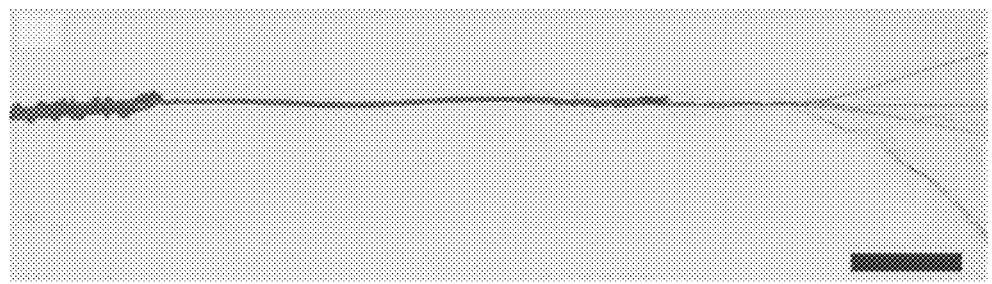
FIG. 8 depicts an optical micrograph of a rootlike vascular network that was created by connecting a branch of 20 micrometer fibers to a 500 micrometer fiber via a 200 micrometer intermediary fiber, and then filling the network with an imaging fluid.

FIG. 6 depicts optical and scanning electron micrographs of cross sections of channels in a polymeric matrix, created from sacrificial fibers having diameters of 500, 200, and 20 micrometers. The scale bar in the micrographs corresponds to 250 micrometers. Curvature appeared to have minimal effect on the removal of the fiber, with both straight and curved channels being formed completely under standard conditions. Interconnections for a 3D network were created by vascularizing overlapping fibers. FIG. 7 depicts a microscale X-ray computed tomography (micro-CT) image of a channel interconnect formed at the point of contact between two overlapping 500 micrometers sacrificial fibers (scale bar=500 micrometers). For the overlap of two 500 micrometer sacrificial fibers, an opening 180 micrometers in diameter was measured by micro-CF. FIG. 8 depicts an optical micrograph of a rootlike vascular network that was created by connecting a branch of 20 micrometer fibers to a 500 micrometer fiber via a 200 micrometer intermediary fiber, and then filling the network with an imaging fluid (scale bar=0.5 cm).

As described above with regard to sacrificial fiber 350, sacrificial fibers for use in VaSC methods preferably have a combination of properties, including sufficient strength for weaving and for combining with a matrix precursor using standard composite formation methods, mechanical integrity at temperatures typically used to form composites, and a degradation and volatilization temperature within a narrow range between the highest matrix solidification temperatures and the lowest thermal degradation temperatures of the polymeric matrix.

It has now been discovered that poly(hydroxyalkanoate)s can be modified to produce thermally degradable fibers that can be used successfully as sacrificial fibers in polymeric matrices such as epoxies. These sacrificial fibers preferably are thermally degradable fibers that include a polymeric fiber matrix including a poly(hydroxyalkanoate), and a metal selected from the group consisting of an alkali earth metal and a transition metal, in the fiber matrix, where the concentration of the metal in the fiber matrix is at least 0.1 percent by weight (wt %).

A poly(hydroxyalkanoate) is an aliphatic polyester having the general structure:

where n is an integer of at least 10, x is an integer from 0 to 4, and $R^1$-$R^1$ independently are —H or an alkyl group. Examples of poly(hydroxyalkanoate)s include poly(3-hydroxybutyrate) (P3HB), poly(4-hydroxybutyrate) (P4HB), poly(3-hydroxyvalerate) (PHV), polycaprolactone, polylactic acid) (PLA), poly(glycolic acid) (PGA), and copolymers of the monomeric units of these polymers.

Preferably the concentration of the metal in the poly (hydroxyalkanoate) fiber matrix is at least 0.2 wt %, at least 0.5 wt %, at least 1 wt %, at least 2 wt %, at least 2.5 wt %, at least 3 wt %, at least 5 wt %, at least 7 wt %, or at least 10 wt %. The concentration of the metal in the poly (hydroxyalkanoate) fiber matrix may be from 0.1 to 10 wt %, from 0.2 to 7 wt %, from 0.5 to 5 wt %, or from 1 to 3 wt %. Preferably the metal is present in the fiber as MgO, CaO, BaO, SrO, tin(II) acetate, tin(II) oxalate, tin(II) octoate, or scandium triflate (Sc(OTf)$_3$). More preferably the metal is present in the fiber as strontium oxide, tin(II) oxalate or tin(II) octoate.

Poly(lactic acid) (PLA) is a thermoplastic poly(hydroxyalkanoate) that depolymerizes at temperatures above 280° C., forming lactide as a gaseous degradant. Existing epoxy processing protocols, however, can require milder processing conditions, to prevent damage to the epoxy matrix. Although it had been reported that the depolymerization temperature of PLA films could be reduced by blending PLA with calcium oxide or tin reagents, it was not known whether a catalyst incorporated into fibers of PLA could provide depolymerization within an appropriate temperature range, but without degrading the desirable mechanical properties of the fibers below the $T_D$.

Figure 9:
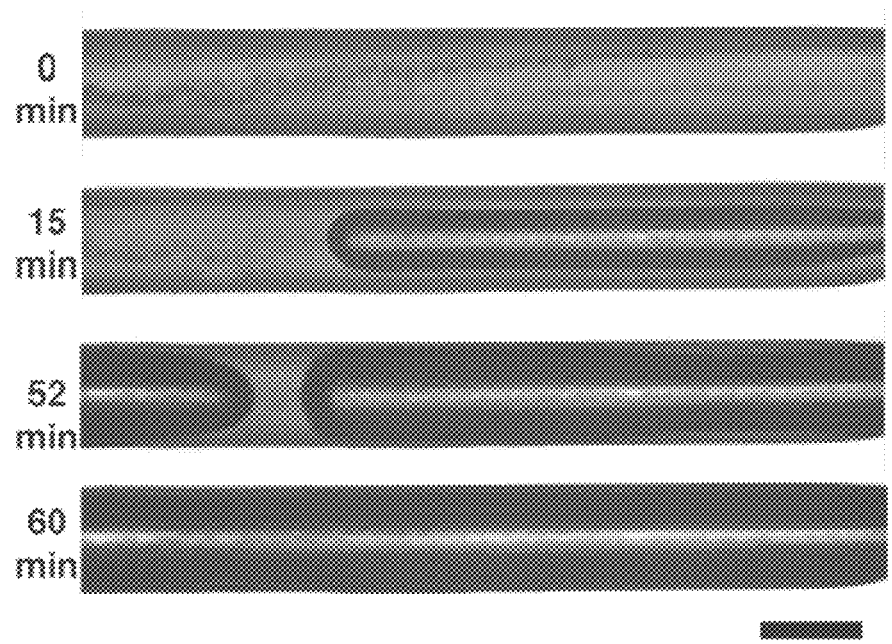
FIG. 9 depicts optical micrographs showing the time evolution of fiber clearing.

When incorporated into a resin matrix, PLA fibers including an alkali earth metal or a transition metal, where the concentration of the metal in the fiber matrix is at least 0.1 wt %, preferably may be removed by heating at 200° C. The heating and removal may occur over the course of several minutes to several hours. Preferably the heating and removal are completed in at most 24 hours, at most 5 hours, at most 3 hours, or at most 2 hours. FIG. 9 depicts optical micrographs showing the time evolution of fiber clearing (scale bar=200 micrometers) where the modified PLA fiber was heated at 200° C. using a temperature controlled stage. The fiber melted first and then produced gas bubbles that expelled liquid out of the channel ends. The residual material was evaporated, resulting in complete clearing of the channel.

PLA fibers including an alkali earth metal or a transition metal, where the concentration of the metal in the fiber matrix is at least 0.1 wt %, preferably are compatible with fiber preform fabrication. Preferably the single fiber tension strength of a modified PLA fiber exceeds the threshold stress of 23 MPa applied during automated weaving. Preferably the single fiber tension strength of a modified PLA fiber is at least 30 MPa, at least 50 MPa, at least 75 MPa, or at least 100 MPa.

The clearing of lactide from the channels formed by degradation of PLA fibers including an alkali earth metal or a transition metal typically results in a very low number of obstructions. Hidden defects in the channels may be present, and may be caused by complex channel geometries. Defects may be detected by calculating a theoretical value for pressure drop according to the Hagen-Pouiselle relation and comparing the prediction with a measured pressure head for the channels. A negligible difference from between these values indicates geometric uniformity and substantially complete channel clearing.

Figure 10:
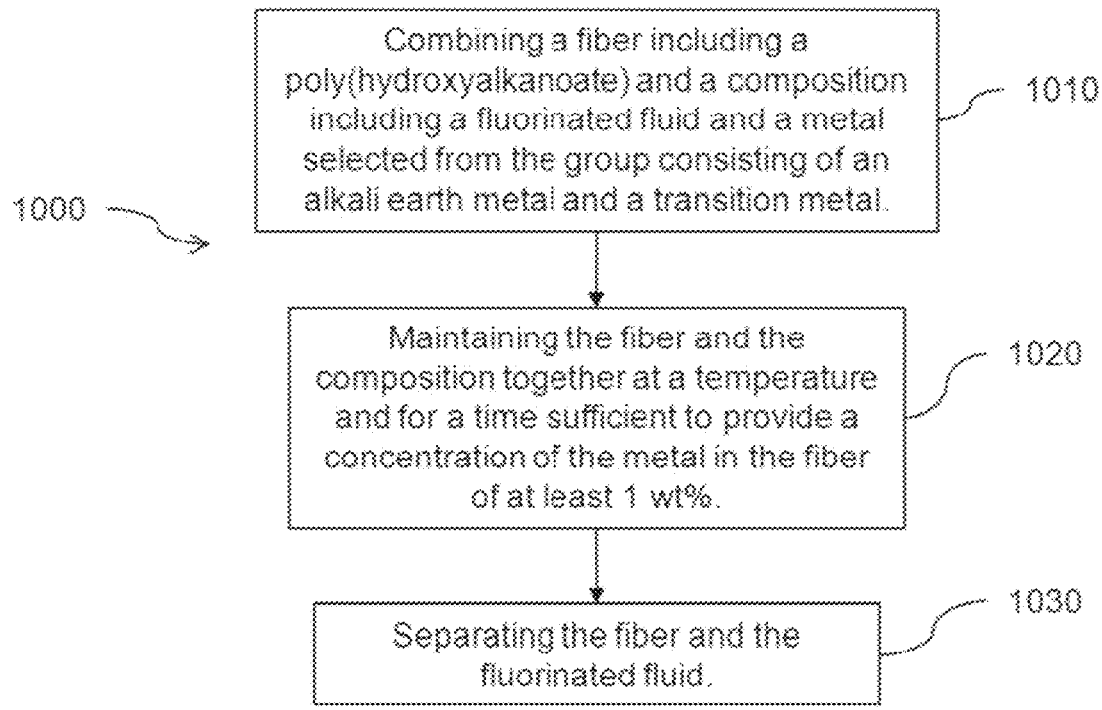
FIG. 10 illustrates a schematic representation of an example of a method of making a degradable fiber.

FIG. 10 illustrates a schematic representation of an example of a method of making a thermally degradable fiber, such as sacrificial fiber 350 of FIG. 3. Method 1000 includes combining 1010 a fiber including a poly(hydroxyalkanoate) and a composition including a fluorinated fluid and a metal selected from the group consisting of an alkali earth metal and a transition metal, maintaining 1020 the fiber and the composition together at a temperature and for a time sufficient to provide a concentration of the metal in the fiber of at least 0.1 wt %, and separating 1030 the fiber and the fluorinated fluid.

An alkali earth metal or a transition metal may be incorporated into a poly(hydroxyalkanoate) fiber through an infusion process such as method 1000. In one example, PLA fibers may be infused with a tin(II) oxalate (SnOx) catalyst present in an aqueous trifluoroethanol (TFE) mixture. Exposing the PLA fibers to a solution of TFE:H$_2$O using a ratio of 60:40 parts by volume (pbv) with 2% SnOx parts by weight (pbw), for a minimum of 24 h yielded sacrificial fibers suitable for VaSC. The catalyst-containing fibers converted to gas at a lower temperature and in less time than did pure PLA fibers, as measured by isothermal gravimetric analysis (iTGA), indicating a lower depolymerization onset temperature.

Figure 11:
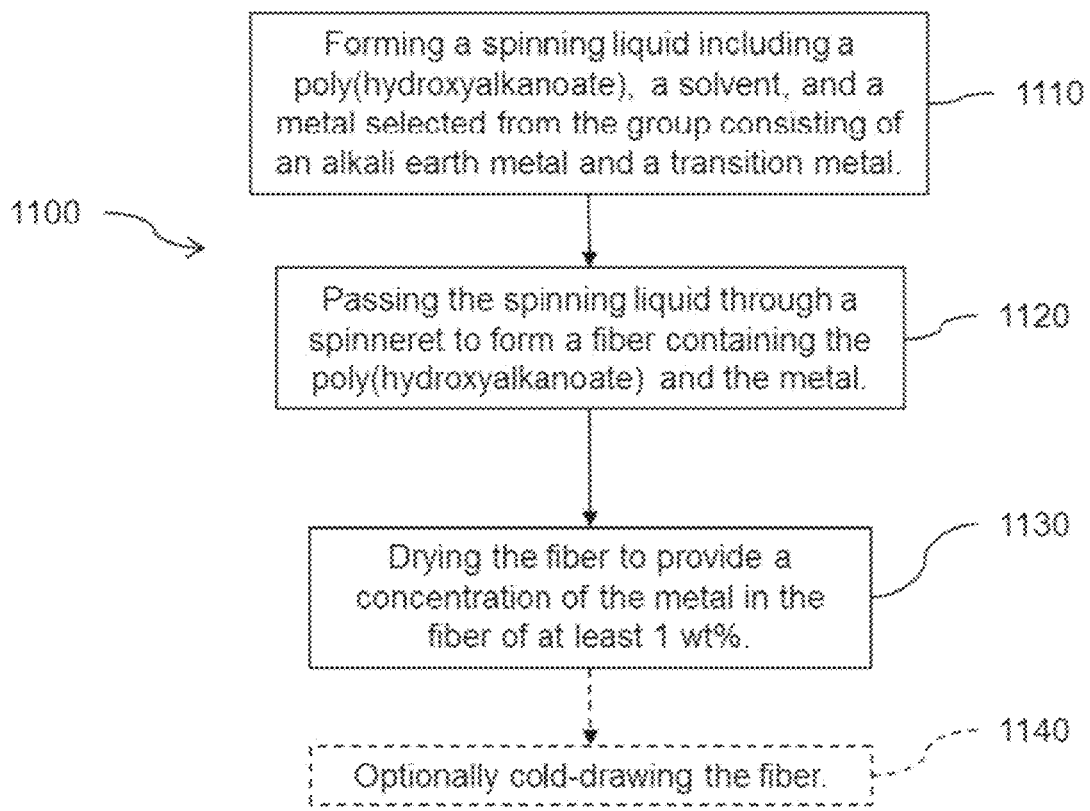
FIG. 11 illustrates a schematic representation of an example of a method of making a degradable fiber.

FIG. 11 illustrates a schematic representation of another example of a method of making a thermally degradable fiber, such as sacrificial fiber 350 of FIG. 3. Method 1100 includes forming 1100 a spinning solution including a poly(hydroxyalkanoate), a solvent, and a metal selected from the group consisting of an alkali earth metal and a transition metal, passing 1120 the spinning solution through a spinneret to form a fiber containing the poly(hydroxyalkanoate) and the metal, drying 1130 the fiber to provide a concentration of the metal in the fiber of at least 0.1 wt %, and optionally cold-drawing 1140 the fiber.

An alkali earth metal or a transition metal may be incorporated into a poly(hydroxyalkanoate) fiber through a liquid spinning process such as method 1100. In one example, a solution of PLA in dichloromethane containing 10% SnOx pbw was spun through a 0.5 millimeter (mm) spinneret to provide a continuous strand of PLA containing the SnOx catalyst. The catalyst-containing fibers formed by liquid spinning converted to gas at a lower temperature and in less time than did comparable fibers formed by an infusion process, such as method 1000, as measured by thermogravimetric analysis (TGA), indicating a lower depolymerization onset temperature. Cold-drawing the fibers formed from liquid spinning could increase the fiber strength, ensuring that the fibers can be woven using conventional techniques.

Thermally degradable fibers formed by a liquid spinning process such as method 1100 may include a more homogeneous dispersion of catalyst within the fiber than do fibers formed by an infusion process such as method 1000. An improvement in catalyst distribution provides for more of the poly(hydroxyalkanoate) polymer to be in close proximity to a catalyst species, which in turn can result in a more efficient depolymerization and a more rapid removal of the fiber.

A liquid spinning process such as method 1100 may be more efficient in its use of catalyst than an infusion process such as method 1000. For example, a spun fiber formed by method 1100 may include a higher concentration of catalyst than an infused fiber formed by method 1000, even though the spinning liquid and the infusion liquid include the same initial concentration of catalyst. Thus, to achieve a given loading of catalyst in a thermally degradable fiber, a liquid spinning process may require less total catalyst than a comparable infusion process.

Thermally degradable fibers formed by a liquid spinning process such as method 1100 may include a wider variety of depolymerization catalysts than can be included using an infusion process such as method 1000. In one example, infusion of PLA fibers with tin(II) octoate (SnOc) provided fibers with a greasy surface, whereas liquid spinning provided PLA fibers containing SnOc, but with a more desirable non-greasy surface. As the depolymerization temperature of PLA fibers containing SnOc is lower than that of PLA fibers containing SnOx, the liquid spinning method can provide PLA fibers that are readily incorporated into a composite and that depolymerize at a relatively low temperature.

Thermally degradable fibers formed by a liquid spinning process such as method 1100 may reduce the fabrication time of the fibers, and also may reduce the fabrication time of a microvascular system made using the fibers. While an infusion process can be effective in forming thermally degradable fibers, the process can require 24 hours for infusing the catalyst into the fibers, another 24 hours for separating and drying the fibers, and then another 24 hours for degrading and removing the fibers once a composite is formed that includes the fibers. In contrast, thermally degradable fibers may be formed through liquid spinning within 1 hour, the fibers may be dried within 24 hours, and then the fibers may be degraded and removed from a composite within 2 hours.

A method of making a thermally degradable fiber may include other known methods of incorporating an additive into a polymer fiber, such as melt spinning. In the example of melt spinning, the temperature of the material should be maintained below 180° C., the temperature at which PLA can depolymerize in the presence of a catalyst containing an alkali earth metal or a transition metal. On potential advantage of melt spinning PLA fibers containing a depolymerization catalyst is that the fibers may be stronger than comparable fibers formed by infusion or by liquid spinning.

A variety of properties may be obtained with a single microvascular system by selection of one or more fluids for introduction to the microchannels. The variation in properties can be obtained without varying the composite's form factor. Examples of materials properties that may be affected by the fluid in the microchannels of the composites include thermal management, electro-magnetic signature, electrical conductivity tuning, and chemical reactivity.

Figure 12:
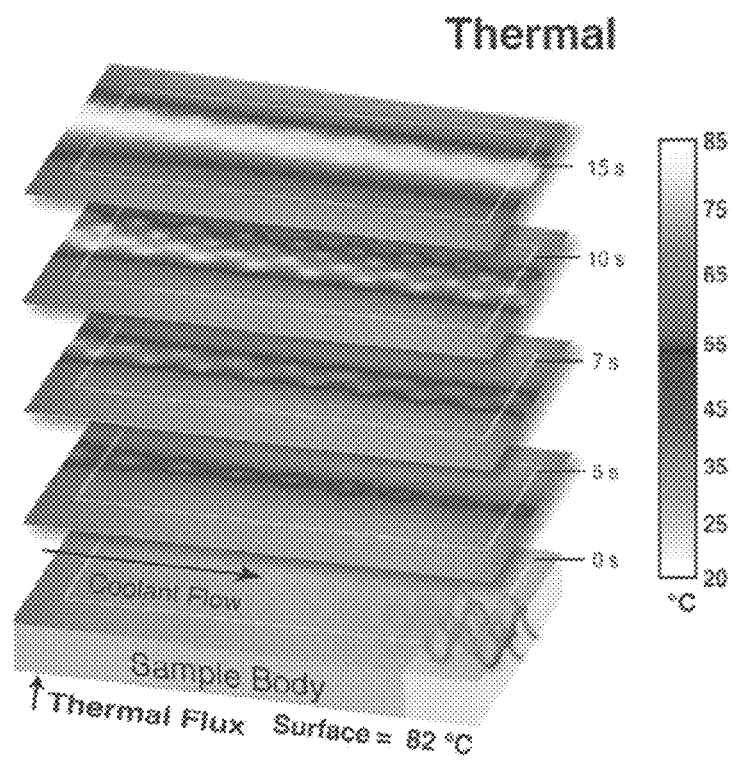
FIG. 12 depicts time lapse thermograms recorded from the top surface of a vascularized composite sitting atop a heated substrate and cooled by circulating water through the channels.

Thermal management of fiber composites is a highly desirable property for many industrial applications. Nature uses microvascular networks for thermal management by transporting thermal energy to the surface of the organism where heat is more rapidly dissipated. With the introduction of flowing water through a heated 3D microvascular composite, the surface temperature was significantly reduced, potentially increasing the operating temperature of the composite material. FIG. 12 depicts time lapse thermograms recorded from the top surface of a vascularized composite sitting atop a heated substrate (82° C.) and cooled by circulating water (21° C.) through the channels (10 mL/min).

Figure 13:
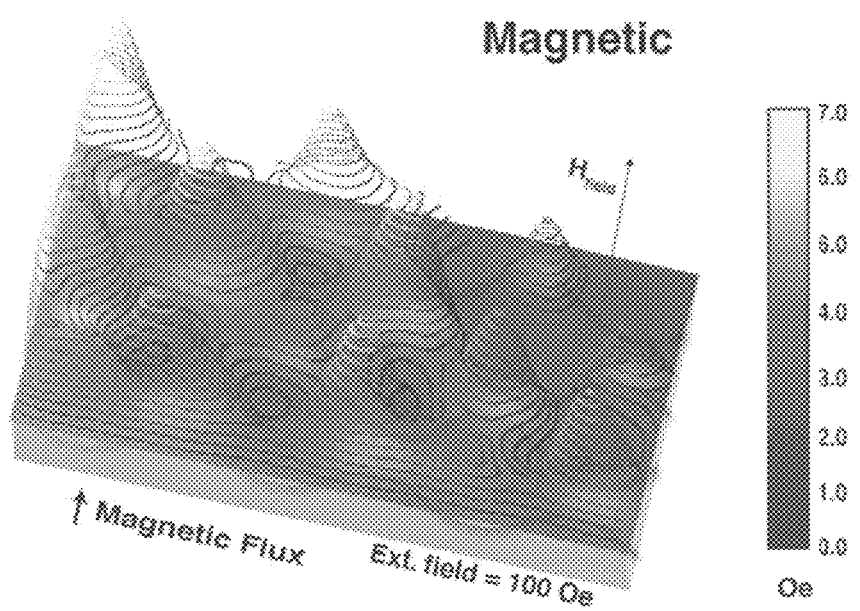
FIG. 13 depicts a magneto-optical microscopy image showing out-of-plane H-magnetic field of 3D composite after being filled with a ferrofluid.

Structures that dynamically change their electro-magnetic (EM) signature are sought both for the ability to transmit information about their physical state, as well as the opposite ability to cloak a surrounding EM field. By filling the channels of a 3D microvascular composite with a ferrofluid, the magnetic field in proximity to the composite was modulated. FIG. 13 depicts a magneto-optical microscopy image showing the out-of-plane H-magnetic field of the microvascular composite having 500 micrometer channels, after being filled with a ferrofluid. The magnetic signature of the composite, seen as bright spots at approximately 7 Oe correlated with the underlying capillary architecture.

Figure 14:
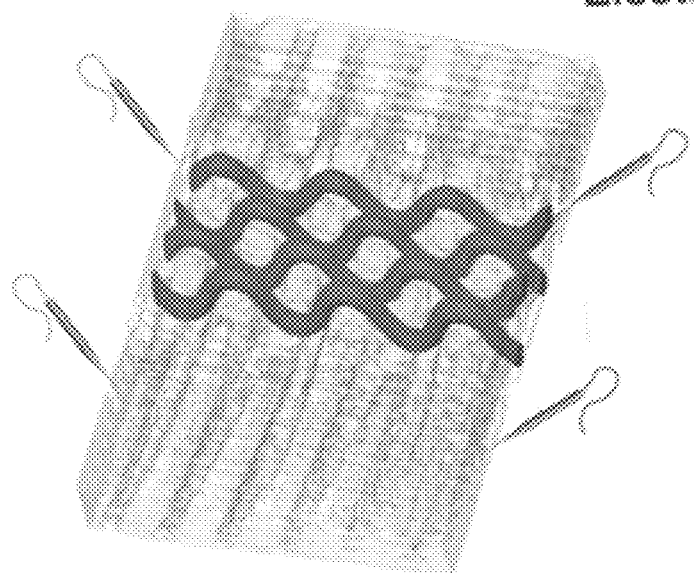
FIG. 14 depicts a micro-CT image of a composite with glass fibers and channels filled with electrically conductive gallium-indium alloy.

Dynamic tuning of electrical conductivity of composites is a desirable property as a means to transmit information and energy. A conductive liquid metal, eutectic gallium-indium (EGaIn 75%-Ga 25%-In pbw), was placed inside the channels of a 3D microvascular composite, and the microvascular network was imaged using micro-CT, revealing symmetric placement of electrically conductive channels. FIG. 14 depicts a micro-CT image of the microvascular composite with glass fibers (clear) and channels filled with electrically conductive gallium-indium alloy (shaded). A comparison of conductivity measured across the channel to a measurement made across the glass/epoxy composite revealed an increase in conductivity by seven orders of magnitude.

Figure 15:
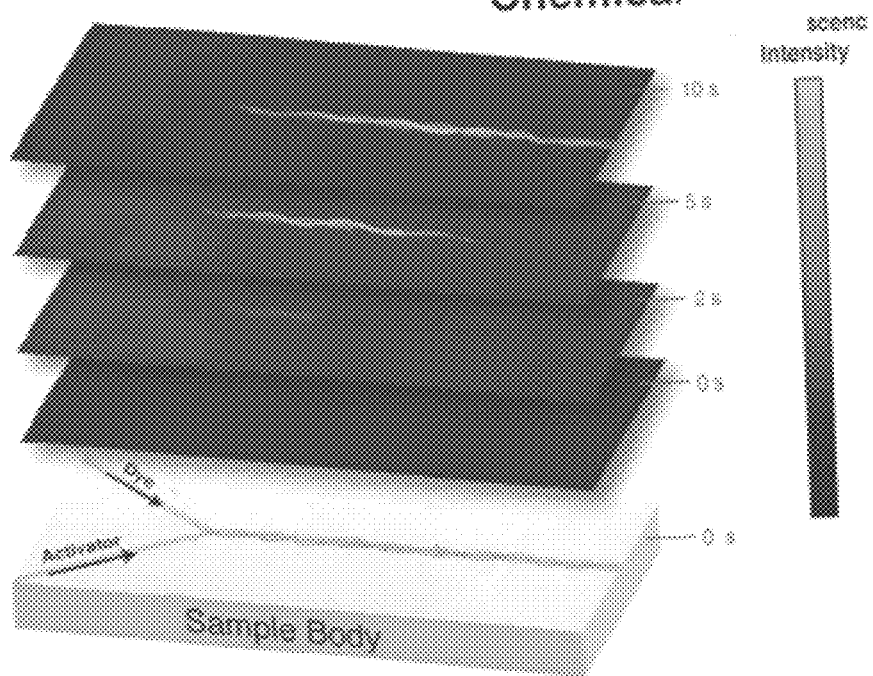
FIG. 15 depicts time lapsed micrographs of the composite, in which a two-part chemiluminescent solution was flowed through two connected channels.

Microvascular networks capable of chemical reactivity are relevant for a range of applications in microfluidics and self-healing systems. As a simple demonstration of a network's ability to perform a chemical reaction, a two-channel mixing network was created. A channel containing a chemiluminescent solution was mixed via fiber interconnects with one containing activator to demonstrate chemical reactivity inside microchannels. FIG. 15 depicts time lapsed micrographs of the composite, in which a two-part chemiluminescent solution was flowed through two connected channels resulting in a luminescent reaction (center) inside the material. Mixing led to the spontaneous production of light in the channels indicating that a reaction had taken place.

The following examples are provided to illustrate one or more preferred embodiments of the invention. Numerous variations can be made to the following examples that lie within the scope of the invention.

EXAMPLES

General Materials & Procedures

PLA fibers having diameters of 20, 200 or 500 micrometers were obtained from Teijin Monofilament Germany GmbH and used as received. PLA pellets (P1566, Mw=85,000-160,000) for catalyst screening were used as received from Sigma-Aldrich. PLA pellets (Mw=339,000) for forming fibers by solution spinning were used as received from Purac Biomaterials.

Catalysts magnesium oxide (MgO), calcium oxide (CaO), barium oxide (BaO), strontium oxide (SrO), scandium triflate (Sc(OTf)$_3$), tin(II) acetate, tin(II) oxalate, tin(II) octoate were obtained from Sigma-Aldrich unless otherwise noted.

Diglycidyl ether of bisphenol A resin (DGEBA or EPON 828) was used as received from Miller-Stephenson, and the curing agent EPIKURE 3300 was used as received from Hexion. Epoxy samples were prepared using a mass ratio of 22.7 parts per hundred (pph) EPIKURE 3300 to EPON 828.

Trifluoroethanol (TFE) was obtained from Halogen Inc. Other chemicals were all obtained from Sigma-Aldrich unless otherwise noted.

Thermogravimetric analysis (TGA) was performed on a Mettler-Toledo TGA851e, calibrated with indium, aluminum, and zinc standards. For each experiment, the sample (approximately 10 mg) was weighed (±0.02 mg) in an alumina crucible. For dynamic measurements, the mass loss was recorded during a heating cycle over the temperature range of 25 to 650° C. at a heating rate of 10° C./min. For isothermal experiments, the temperature was ramped from 25 to 240° C. at a rate of 50° C./min and subsequently held at 240° C. for 2 h.

Differential scanning calorimetry (DSC) was performed on a Mettler-Toledo DSC 821e using a nitrogen atmosphere to measure heat flow (positive exothermal) from 25 to 450° C. at a heating rate of 10° C./min.

Fiber surface morphology and fiber removal in epoxy matrices were imaged using a Leica DMR Optical Microscope at various magnifications. ImageJ software was used to measure fiber diameters from acquired images for each batch of fibers produced and to measure the fraction of PLA fiber removed.

Analytical gel permeation chromatography (GPC) was performed on a Waters 515 HPLC pump, a Viscotek TDA Model 300 triple detector array, a Thermoseparations Trace series AS100 autosampler, and a series of 3 Waters HR Styragel columns (7.8×300 mm, HR3, HR4, and HR5) in THF at 30° C. The GPC was calibrated using monodisperse polystyrene standards, and all molecular weight data were reported as polystyrene equivalents.

Environmental Scanning Electron Microscopy (ESEM, Philips XL30ESEM-FEG) was used to image cross-sections of the holomatrix and to image empty channels. SEM images were acquired after sputter-coating the sample surface with carbon or gold-palladium, and were collected using backscattered electrons. Selected area elemental analysis was performed by EDS (Energy Dispersive X-ray Spectroscopy, attached to the SEM) with a 20 kV electron source and spot size of 3.0 nm.

Mass spectra were recorded on a 70-VSE C in ES+ mode through the University of Illinois Mass Spectrometry Laboratory, SCS.

$^1$H-NMR spectra were obtained using a Varian 400 spectrometer in the VOICE NMR laboratory at University of Illinois. Spectra were referenced to the residual proton solvent (CDCl$_3$) peak.

An Xradia BioCT (MicroXCT-400) was used to image the apomatrix at 40 key (8 W power and 200 µA current) at a 4× objective for 5 s exposure times. Rotation intervals were 0.25° for a complete 360° scan. Images were visualized in 3D with XM3Dviewer and reconstructed in 3D using XMReconstructor. Reconstructed images were reproduced in Amira to enhance the color and contrast.

The tensile strength of spun fibers was measured at room temperature on an Instron Machine (Instron Mini-44). For each test sample, a fiber with the gauge length of 30 mm was clamped between pneumatic grips, and the test was performed in a displacement controlled mode using rate of 10 mm/min. The corresponding tension load was measured using a 500 N load cell. Engineering stress and strain were calculated and plotted using the load-displacement data.

Wide angle X-ray Scattering (WAXS) analysis was conducted through the Materials Chemistry Laboratory at the University of Illinois. WAXS data were collected on a Bruker General Area Detector Diffraction System (GADDS) equipped with a P4 four-circle diffractometer and HiStar multiwire area detector. A Bruker M18XHF22 rotating anode generator operating at 50 kV and 40 mA supplied the Cu Kα graphite monochromatized incident beam. WAXS analysis of fibers was performed on several fibers mounted parallel to each other an aluminum mount, where the sample to detector distance was 8.5 cm. Two frame series were collected at 2θ settings of −10, 0, and 10 degrees. The first frame series was collected with the fibers aligned vertically and the second series was collected with the fibers in horizontal alignment. The combined 2D images were then integrated and combined into 1D patterns.

Example 1: Screening of Catalysts for PLA Depolymerization

Catalysts that had been reported to decrease the depolymerization temperature of PLA were screened. The catalysts investigated included earth metal oxides, tin-containing compounds, and rare metal triflates. The catalysts listed above were screened by the reported literature procedure (Fan, Y. et al. *Polymer* 2004, 45, 1197-1205), except that commercial PLA pellets were used. Commercial PLA pellets were dissolved in chloroform (1 g/mL) and the test catalysts were blended into the viscous solution (approximately 10 wt % to PLA). The mixture was vigorously stirred for 1 h to disperse the catalysts uniformly. The dispersed mixture was cast on a petri dish and allowed to dry before rinsing with methanol. A thin film was obtained on the petri dish and was dried under vacuum (0.2 torr) for 24 h. The vacuum-dried films were then removed from the petri dish and manually cut into pieces for TGA experiments.

Figure 16A:
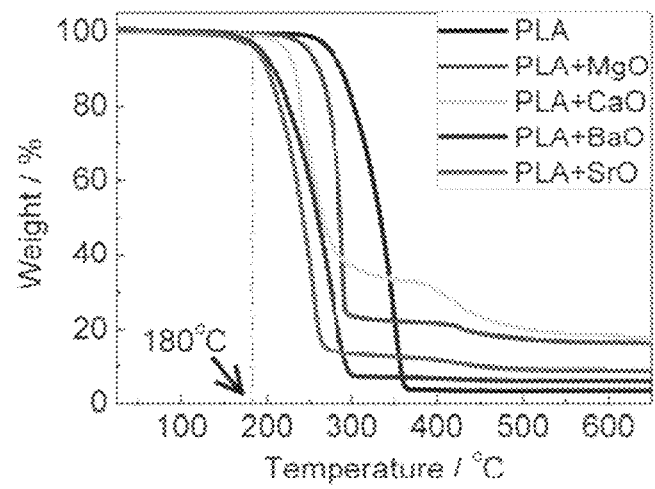
FIGS. 16A and 16B represent dynamic thermogravimetric analysis (TGA) curves of poly(lactic acid) (PLA) films blended with earth metal oxides (16A) and tin-containing compounds and metal triflates (16B).
Figure 16B:
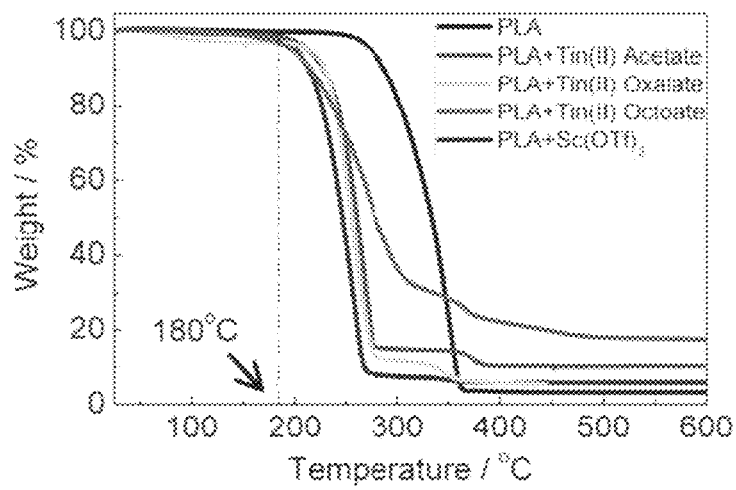

FIGS. 16A and 16B represent dynamic TGA curves of PLA films blended with earth metal oxides (16A) and tin-containing compounds and metal triflates (16B). Among the catalysts screened, strontium oxide and tin(II) octoate had the greatest effect on the PLA depolymerization onset temperature, decreasing it to nearly 180° C., approximately 100° C. lower than unmodified PLA.

PLA blended with tin(II) oxalate began to depolymerize at a temperature approximately 80° C. lower than unmodified PLA (FIG. 16B). The dispersibility of tin(II) oxalate in TFE/water mixture guaranteed good catalyst incorporation into the fiber. Moreover, DSC analysis revealed the thermal stability of tin(II) oxalate up to the PLA catalytic depolymerization temperature range. As a result, tin(II) oxalate was selected for modifying PLA fibers through an infusion process.

Example 2: Screening of Catalysts for Fiber Compatibility

Catalysts were incorporated into PLA sacrificial fibers by a modified literature procedure (Quirk, R. A. et al. *Macromolecules* 2000, 33, 258-260). Catalysts were evenly dispersed (2 wt %) in a miscible mixture of trifluoroethanol (TFE, a PLA solvent) and water (a PLA nonsolvent). The PLA fibers were soaked in the stirred solvent/catalyst mixture at 37° C. for a period of different times (2-24 h), removed and subsequently air-dried. In some cases, rhodamine 6G (0.5 wt %) was incorporated into PLA fibers using the same fiber treatment procedure, for improved visualization during macroscopic imaging.

In order to survive conventional composite fabrication, the catalyst should not significantly change the mechanical properties of the fibers. Both strontium oxide and tin(II) octoate degraded PLA fiber properties. Strontium oxide, as well as other earth metal oxides, formed strongly basic hydroxides upon contact with water, which deteriorated the PLA fibers. Surface damage was evident by visual inspection, where the oxide caused either a reduction of the fiber's cross-sectional area or branching of the fiber. Tin(II) octoate, an oily liquid, had poor dispersibility in the solvent mixture and resulted in greasy fibers.

Figure 16C:
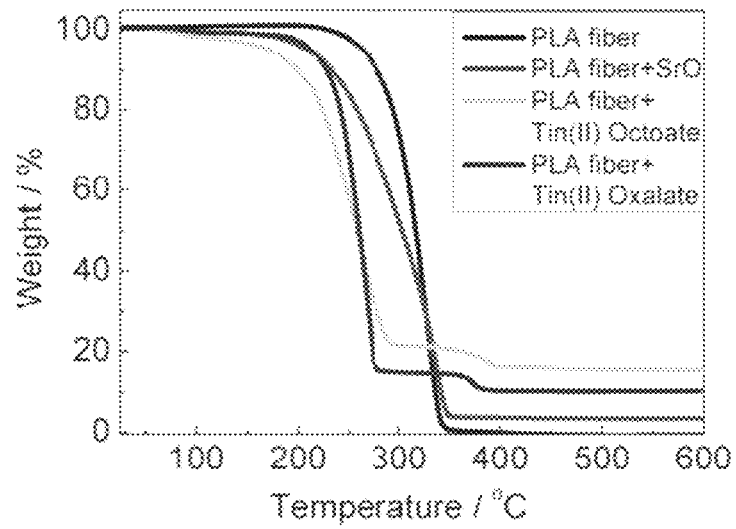
FIG. 16C represents dynamic TGA curves of untreated PLA fiber and of PLA fibers blended with various catalysts.

FIG. 16C represents dynamic TGA curves of untreated PLA fibers and of PLA fibers blended with various catalysts. As shown in FIG. 16C, these two catalysts also proved compatible with the fiber treatment protocol, and lowered the depolymerization temperature of PLA fibers. The significant decrease in depolymerization temperature was deemed low enough for fibers to be removed prior to thermal damage of conventional epoxy matrices.

Example 3: Catalyst Incorporation into PLA Fibers by Solvent Infusion

The PLA fiber was soaked in the TFE/water mixture, which caused rapid polymer swelling at the surface, allowing for infiltration of catalysts into the fiber. The effects of solvent composition, fiber-solvent soaking time, and post-soak treatment by isothermal TGA were evaluated, and these data were correlated with observations of fiber removal. These experiments were performed using PLA fibers with a diameter of 500 micrometers, and tin(II) oxalate concentration in the solvent mixture was fixed at 2 wt %.

The chemically treated PLA fibers were embedded in an EPON 828: EPIKURE 3300 matrix that was cured in a silicone rubber mold using the standard protocol. Sacrificial fibers were held straight in RTV Silicone molds before filling the mold with epoxy. Epon 828 epoxy resin and a cycloaliphatic amine curing agent Epikure 3300 were mixed at a ratio of 100:22.7 pbw and degassed until air bubbles ceased to form. The post-curing cycle involved heating the specimens at 82° C. for 90 minutes followed by 150° C. for an additional 90 minutes.

The resulting holomatrices were carefully polished before thermal treatment so that fiber ends were exposed. The holomatrices were heated in a sealed vacuum oven (Fisher Isotemp 283) at a constant temperature (ranging from 180 to 220° C.) under vacuum (1 torr). The fraction of fiber removed (defined as the ratio of empty channel length over the full fiber length) was measured for each sample after heating for 2 h.

Figure 17A:
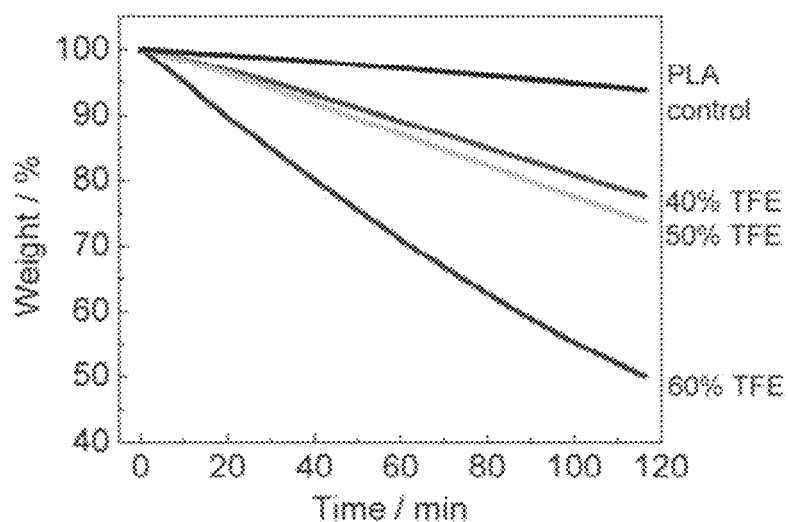
FIG. 17A depicts isothermal TGA curves (240° C.) showing the effect of solvent composition.
Figure 17B:
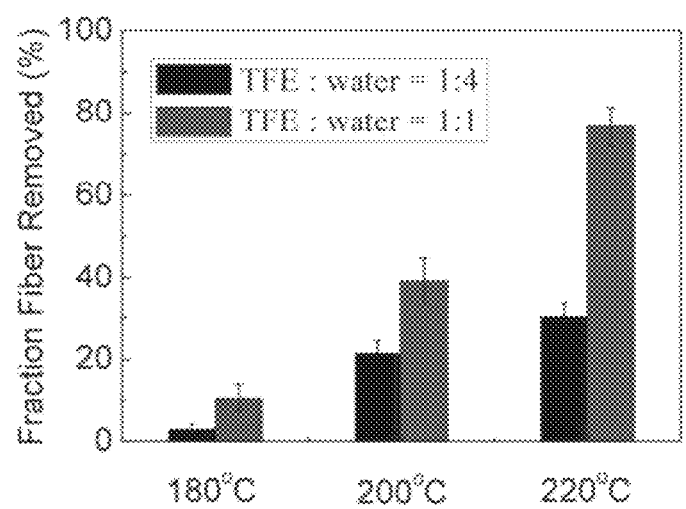
FIG. 17B depicts a graph of %-fiber removal at different temperatures for varying solvent compositions.

Solvent composition (the ratio of TFE to water) was investigated so that maximum catalyst incorporation was achieved without dissolving the fiber. Control experiments demonstrated the TFE/water treatments lacking a catalyst had no effect compared to untreated fibers. When catalyst was present in the soaking bath, TGA showed faster PLA mass loss with an increased amount of TFE in the mixture. FIG. 17A depicts isothermal TGA curves (240° C.) showing the effect of solvent composition (soaking time: 12 h), in which the uppermost black line is for a 500 micrometer diameter PLA fiber treated with 100% $H_2O$ with 2 wt % tin(II) oxalate as control. At 240° C., the rate of PLA fiber weight loss increased significantly as the TFE/water ratio increased up to 60:40, above which, the fibers were dissolved. TFE facilitated swelling, presumably allowing more catalysts to diffuse in, which caused a faster depolymerization reaction upon heating. The amount of catalyst entrapped in the fiber determined the efficiency of sacrificial fiber removal, which was manifested in the fiber removal measurements. FIG. 17B depicts a graph of %-fiber removal at different temperatures for varying solvent compositions (fiber length: 5 cm, thermal treatment time: 2 h). When other processing parameters were held constant, fibers treated with more TFE had a larger fiber removal fraction under the same thermal conditions.

Figure 18A:
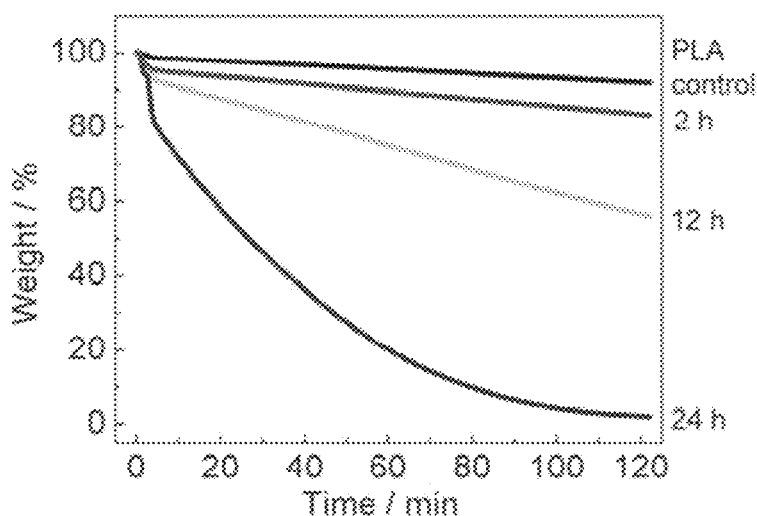
FIG. 18A depicts isothermal TGA curves (240° C.) showing the effect of different soaking times.
Figure 18B:
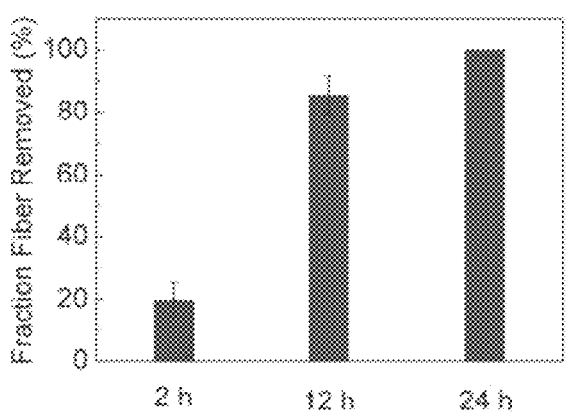
FIG. 18B depicts a graph of %-fiber removal at varying soaking times.

The fiber soaking time also affected the treatment efficiency, presumably because longer time allowed more catalysts to diffuse into the fiber. PLA fibers were soaked in the solvent/tin(II) oxalate mixture for varying amounts of time (2-24 h), and subsequently analyzed the depolymerization reaction. Isothermal TGA showed a significant increase in the rate of PLA fiber weight loss with increased soaking time. FIG. 18A depicts isothermal TGA curves (240° C.) showing the effect of different soaking times (solvent composition: 60% TFE), where the uppermost black line is for a PLA fiber with no treatment as control. Fiber removal data was consistent with TGA observations, showing that the fiber treated for the longest time yielded the fastest rate of removal. FIG. 18B depicts a graph of %-fiber removal at varying soaking time (fiber length: 5 cm, solvent composition: 60% TFE, thermal treatment temperature: 200° C., thermal treatment time: 2 h).

Figure 19:
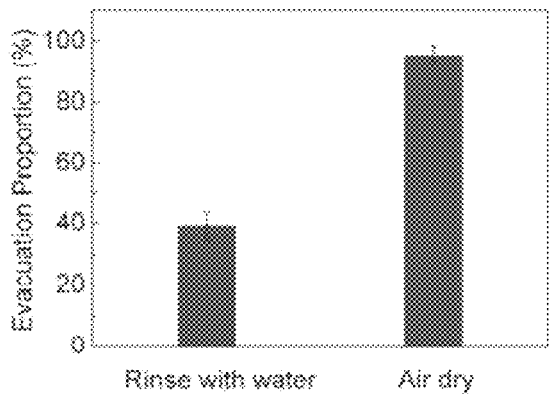
FIG. 19 depicts a graph of %-fiber removal at different post-exposure treatments.

In a literature procedure, polymer swelling was reversed by the addition of a large excess of nonsolvent (water). In the present example, adding a large amount of water resulted in a decrease in the rate and extent of the thermal depolymerization compared to the simple solvent evaporation. Thus, after soaking the fiber in a solvent/catalyst mixture, the fiber was removed and dried in the air which allowed the solvent to evaporate and the catalyst particles to become immobilized. Under otherwise identical processing conditions, fibers that were dried in the air had a significantly larger fraction of thermally depolymerized fiber than those treated with water. Thus, an optimum method to quench catalyst infusion was simple air-drying. FIG. 19 depicts a graph of %-fiber removal at different post-exposure treatments (fiber diameter: 500 micrometers, solvent composition: 60% TFE, tin(II) oxalate concentration: 2 wt %, soak time: 12 h, thermal treatment temperature: 200° C., thermal treatment time: 2 h).

For PLA fibers (diameter: 500 micrometers), the optimum processing procedure involved soaking PLA fiber in a solvent mixture containing 60% TFE and 40% $H_2O$ dispersed with 2 wt % tin(II) oxalate for 24 h and air-drying the fiber afterwards. For PLA fibers of different diameters (20 micrometers and 200 micrometers), the optimum processing procedures involved the same steps with different solvent composition and fiber soaking time (Table 1).

TABLE 1

Fiber processing procedures for PLA fibers of different diameters

| Fiber diameter | Solvent composition | Fiber soaking time | Tin(II) oxalate |
|---|---|---|---|
| 20 micrometers | 20% TFE, 80% water | 12 h | 2 wt % |
| 200 micrometers | 50% TFE, 50% water | 24 h | 2 wt % |
| 500 micrometers | 60% TFE, 40% water | 24 h | 2 wt % |

Figure 20A:
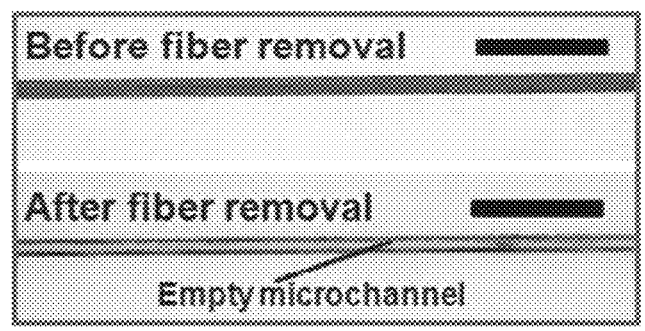
FIGS. 20A and 20B depict optical images of epoxy composites containing both PLA fiber treated with tin(II) oxalate (20A) and untreated PLA fiber (20B).
Figure 20B:
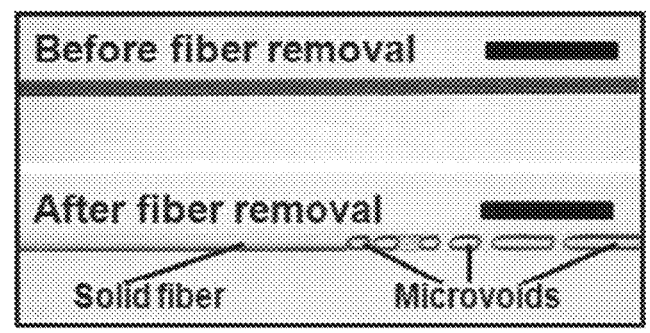

The thermal depolymerization behavior of these chemically treated PLA fibers in an epoxy matrix was compared to that of the untreated one under the same thermal conditions. A 5 cm long, 200 micrometer diameter PLA fiber treated with tin(II) oxalate using the optimized fiber treatment protocol was completely removed after heating in vacuo at 180° C. for 20 h, yielding an empty microchannel. In contrast, a large portion of solid fiber remained for the untreated PLA fiber. FIGS. 20A and 20B depict optical images of epoxy composites containing both PLA fiber treated with tin(II) oxalate (20A) and untreated PLA fiber (20B) (scale bar: 2 mm). For the composite of FIG. 20A, rhodamine 6G (0.5 wt %) was incorporated into the PLA fiber together with tin(II) oxalate. Heat treatment for both composites was conducted at 180° C. in vacuo for 20 hours.

Example 4: Depolymerization of Catalyst-Containing PLA Fibers Formed by Solvent Infusion The PLA fiber molecular weight change during the tin(II) oxalate assisted catalytic depolymerization process was monitored by GPC analysis. PLA fibers (diameter 500 micrometers) treated with catalyst were placed in a vial and heated at 240° C. in a sealed oven. Thermal depolymerization products at each designated time point were extracted and analyzed using GPC. The vapor condensation collected from heated fibers was analyzed by ESI-MS and 1H NMR.

Figure 21A:
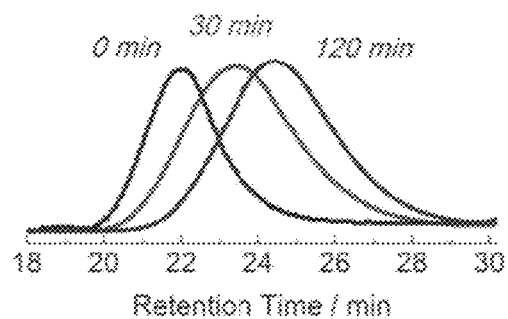
FIG. 21A depicts gel permeation chromatograph (GPC) traces of depolymerization products at various reaction times.
Figure 21B:
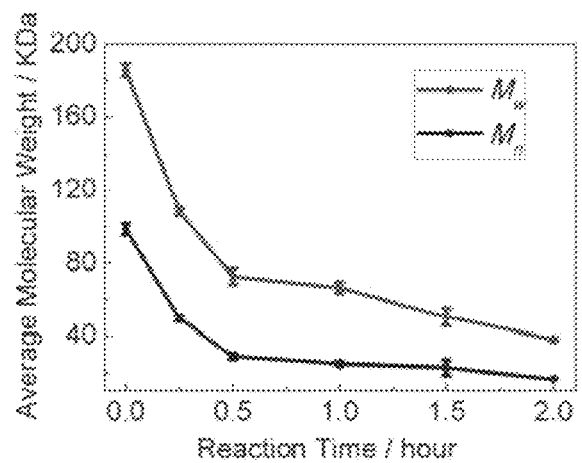
FIG. 21B depicts a graph of number average molecular weight (Mn) and weight average molecular weight (Mw) from the data of FIG. 21A.
Figure 21C:
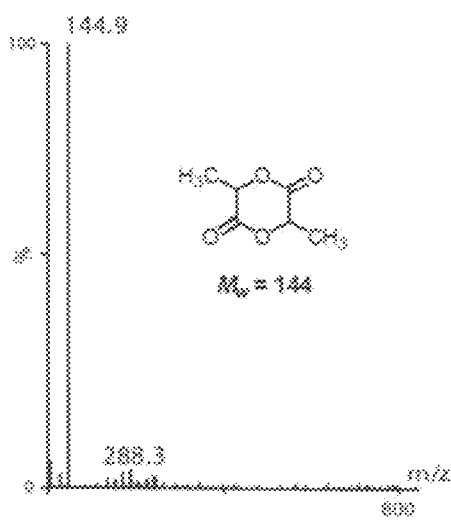
FIG. 21C depicts an electrospray ionization mass spectrometry (ESI-MS) spectrum of the PLA catalytic depolymerization product after 4 h.

FIG. 21A depicts GPC traces of depolymerization products at various reaction times: 0 min, 30 min and 120 min. FIG. 21B depicts a graph of number average molecular weight (Mn) and weight average molecular weight (Mw) from the data of FIG. 21A, that were calibrated and plotted as a function of reaction time. The inflection point around 0.5 h in FIG. 21B may be a change in depolymerization mechanism. As the first step of depolymerization, long chain segments were fragmented due to catalyst assisted cleavage of the ester bonds, and a dramatic molecular weight drop was observed (FIG. 21B). The molecular weight continued to drop at a slower rate (FIG. 21B) as the chain segments depolymerized into oligomers and eventually monomers due to intramolecular backbiting reaction of the polymer chain end. The product of catalyst treated fiber heated at 240° C. for 4 h was analyzed by ESI-MS and $^1$H NMR. FIG. 21C depicts an ESI-MS spectrum of the PLA catalytic depolymerization product after 4 h. Both results indicated lactide monomer as the sole product.

Example 5: Large-Scale Solvent Infusion Treatment of PLA Fibers

The entire process was performed inside a fume-hood. A desired length of fiber (5-10 m) of desired diameter (i.e. 500 micrometers, 200 micrometers) was wound on a customized reel with minimum surface contact. The reel was attached to a digital mixer (Eurostar, IKA Labodechnik) and then lowered in a narrow neck beaker filled with 800 mL of treatment solution (480 mL TFE, 320 mL deionized $H_2O$ and 16 g tin oxalate, 40 mL Disperbyk 187 (Byk Chemie)). In cases where fibers are dyed pink/red, 1 g of Rhodamine 6G was added to the solution prior to fiber addition. The beaker was suspended in a temperature-controlled water bath on a programmable hot plate with an external temperature probe. The solution was agitated with a digital mixer (Eurostar, IKA Labortechnik), driving the reel at 350 RPM for 24 h at 37° C. The entire apparatus was sealed using saran wrap to prevent evaporation of TFE. After 24 h, the reel containing wound fibers was removed and allowed to air dry inside a fume hood for 1 h at which time the fiber was unwound from the reel and wound on spindles for later use.

Example 6: Catalyst Incorporation into PLA Fibers by Solution Spinning

A PLA solution was prepared by dissolving 6 g of PLA pellets in dichloromethane at room temperature, and then removing solvent to provide a solution volume of 35 mL. Catalysts (tin(II) oxalate particles or tin(II) octoate liquid) were blended into the viscous PLA solution to provide a 10 wt % tin equivalence to PLA. The mixture was stirred for half an hour to disperse the catalyst, resulting in a spinning solution.

A spin chamber was pre-heated to 55° C., and 10 mL of the spinning solution was transferred to the chamber. The solution was conditioned in the spin chamber for 5 minutes, and then conditioned outside the chamber for additional 5 minutes before extrusion, allowing the solution to become more concentrated. The spinning solution was then extruded at 55° C. through the chamber at an extrusion speed of 8 cm/hr. The solution passed through a spinneret having a diameter from 0.2 mm to 1 mm, forming a single fiber. Two heating chambers below the spinneret provided additional heat to further evaporate the solvent. The extruded fiber filament was collected on a Teflon bobbin without applying additional stress, and was then air-dried at 50° C. The diameter of the fibers after drying was dependent on the diameter of the spinneret used in the spinning process. A spinneret diameter of 0.25 mm provided a final fiber diameter of 0.14±0.02 mm, a spinneret diameter of 0.50 mm provided a final fiber diameter of 0.42±0.03 mm, and a spinneret diameter of 1.00 mm provided a final fiber diameter of 0.75±0.05 mm.

FIGS. 22A and 22B are SEM images of longitudinal cross-sections of a pure PLA fiber and of spun fibers containing PLA and a catalyst. In the spun PLA fiber containing SnOx, homogeneous tin(II) oxalate particles were clearly observed as white dots (FIG. 22A), which subsequent elemental evaluation confirmed corresponded to tin catalyst. The spun fiber containing SnOc showed a whiter color (FIG. 22B, left) compared to pure PLA fiber (FIG. 22B, right), and elemental evaluation confirmed the existence of tin on the spun fiber. The scale bars in FIGS. 22A and 22B correspond to 400 micrometers. One possible explanation for the SEM images and elemental analysis results is that SnOc catalyst, which is a liquid at room temperature, exists in the spun PLA fiber as a continuous phase, whereas SnOx catalyst, which exists as solid particles at room temperature, forms a discontinuous particulate phase. The more complete mixing of SnOc in the spun PLA fiber is believed to provide a more uniform catalyzed depolymerization reaction upon heating, resulting in more rapid clearing of the channel formed within the surrounding matrix.

The mechanical properties of the spun PLA fibers could be changed by cold-drawing the spun fibers. Cold-drawing fibers may provide an increase in tensile strength, which is theorized to be due to alignment of the individual polymer chains within the fiber during the drawing process. WAXS analysis of PLA fibers that were cold-drawn after being spun is consistent with an increase in polymer chain alignment within these fibers, as the degree of orientation of pure spun PLA fiber (no catalyst) increased from 0% when no drawing was performed to 23% when cold-drawing was performed. Spun PLA fibers were drawn to different draw ratios, and their failure strengths were studied by a single fiber tension test, with the test results plotted in FIG. 23. Cold-drawing appeared to significantly increase the fiber strength, whereas the presence of SnOc catalyst did not appear to affect fiber failure strength significantly. As the measured fiber failure strengths listed in FIG. 23 are greater than 23 MPa, the fibers were expected to survive the weaving process without significant failure.

Figure 24:
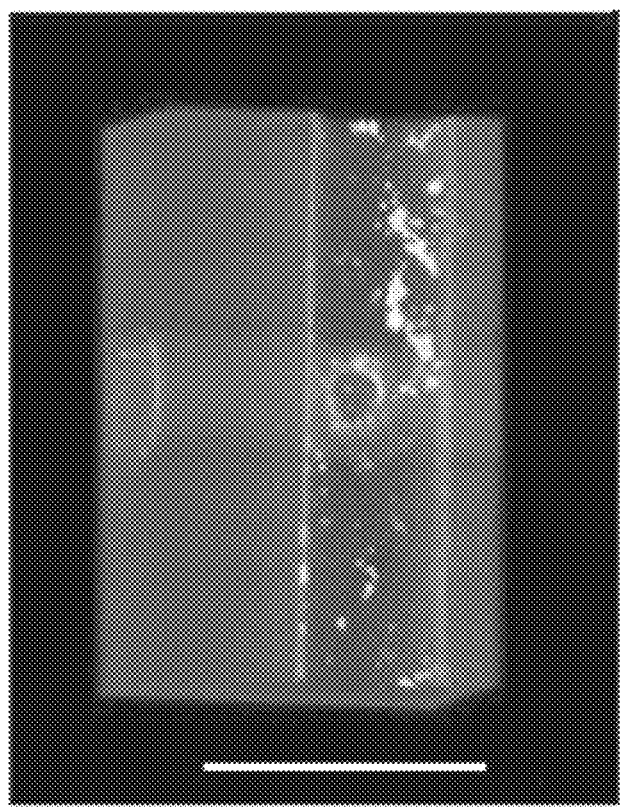
FIG. 24 depicts a micro-CT image of an apomatrix.

Example 7: Behavior of PLA Fibers Treated by Solvent Infusion in an Epoxy Matrix In order to study the catalyst distribution on the fiber, SEM images were obtained of a cross-section of the holo-matrix where the sacrificial fiber was embedded. Tin(II)

oxalate was visible along the edges of the interface. Elemental information revealed the presence of tin-rich regions (white spots) at the fiber interface, compared to the area of epoxy matrix. The apomatrix was further imaged by MicroCT (FIG. 24) and revealed tin on the microchannel surface. The exact diffusion depth of the catalyst and the precise quantity of tin(II) oxalate on the surface are presently unknown.

To examine the effect of fiber curvature on Vaporization of Sacrificial Components (VaSC), a fiber was wrapped around a small, cylindrical piece of room temperature cured epoxy. Specifically, a 200 micrometer fiber was wound around a 2 mm diameter plug to complete a 180° turn. The fiber was embedded in an epoxy matrix followed by thermal depolymerization process resulting in a completely empty 180° curved channel. The image was stitched together from multiple optical microscope pictures using the open source software package Fiji (http://pacific.mpi-cbg.de/wiki/index.php/Fiji).

Fiber removal typically occurred over the period of 24 h, with 95% of the material removed in less than 6 h. At these temperatures, the initially clear and colorless epoxy matrix was slowly discolored upon exposure to oxygen. Under vacuum (1 torr) samples displayed less color change going from colorless to golden-amber. This discoloration occurred primarily at the surface and had no significant impact on mechanical properties of the sample.

Example 8: Comparative Thermal Behavior of PLA Fibers Containing Catalysts

The following types of fibers were analyzed for their behavior at elevated temperatures:
a) untreated PLA fibers,
b) PLA fibers containing SnOx catalyst, formed by solvent infusion,
c) PLA fibers containing SnOx catalyst, formed by solution spinning, and
d) PLA fibers containing SnOc catalyst, formed by solution spinning.

Figure 25:
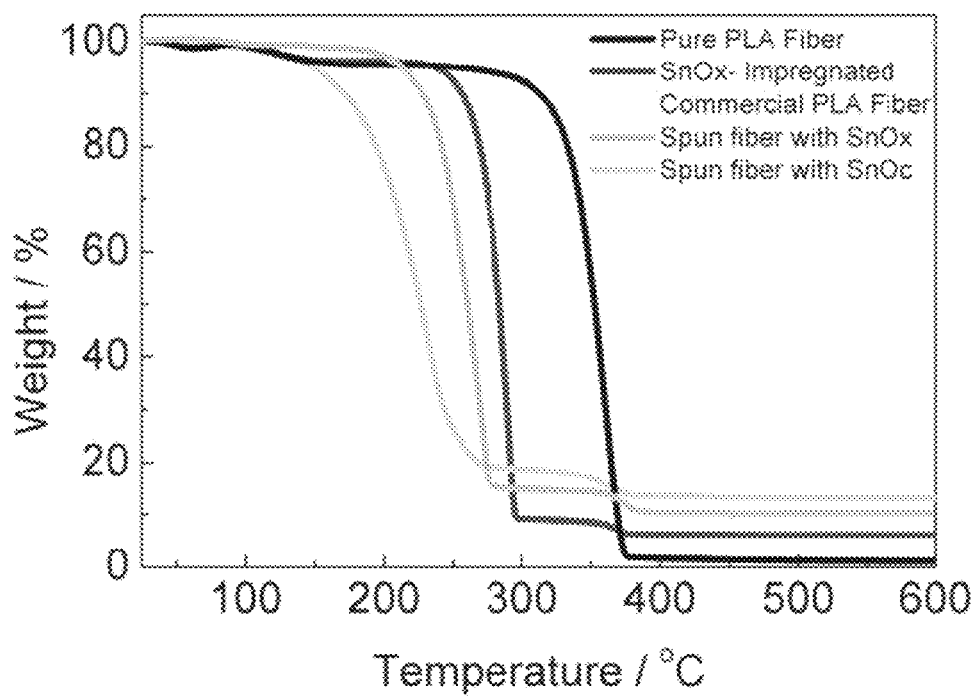
FIG. 25 represents dynamic TGA curves of untreated PLA fiber and of PLA fibers blended with various catalysts.

FIG. 25 shows TGA curves for each type of fiber. Pure PLA fiber showed a depolymerization temperature around 280° C., which was reduced to 200° C. when infused with SnOx. The depolymerization temperature of the spun fibers containing SnOx was lower than that of the infused fibers containing the same catalyst. In addition, the amount of SnOx residue left after heating the spun fiber containing SnOx was more than the residue left after heating the infused fiber, indicating the spun fiber had a higher catalyst loading, even though the infusion liquid and the spinning liquid had comparable concentrations of SnOx catalyst. The lowest decomposition temperature was observed for spun fibers containing SnOc catalyst.

Each type of fiber was embedded in an EPON 828: EPIKURE 3300 epoxy thermoset that was cured in a silicone rubber mold using the standard protocol. The cured epoxy thermoset composites were carefully trimmed before thermal treatment to expose fiber ends. The composites were heated in a sealed vacuum oven (Fisher Isotemp 283) at 200° C. under vacuum (1 torr). The fiber removal fraction was measured as the ratio of empty channel length over the full fiber length for each sample at time intervals of 1 h, 2 h, 4 h and 8 h. Fiber removal data were averaged for each type of fiber over 25 epoxy thermoset samples with 1 inch fiber lengths.

Figure 26:
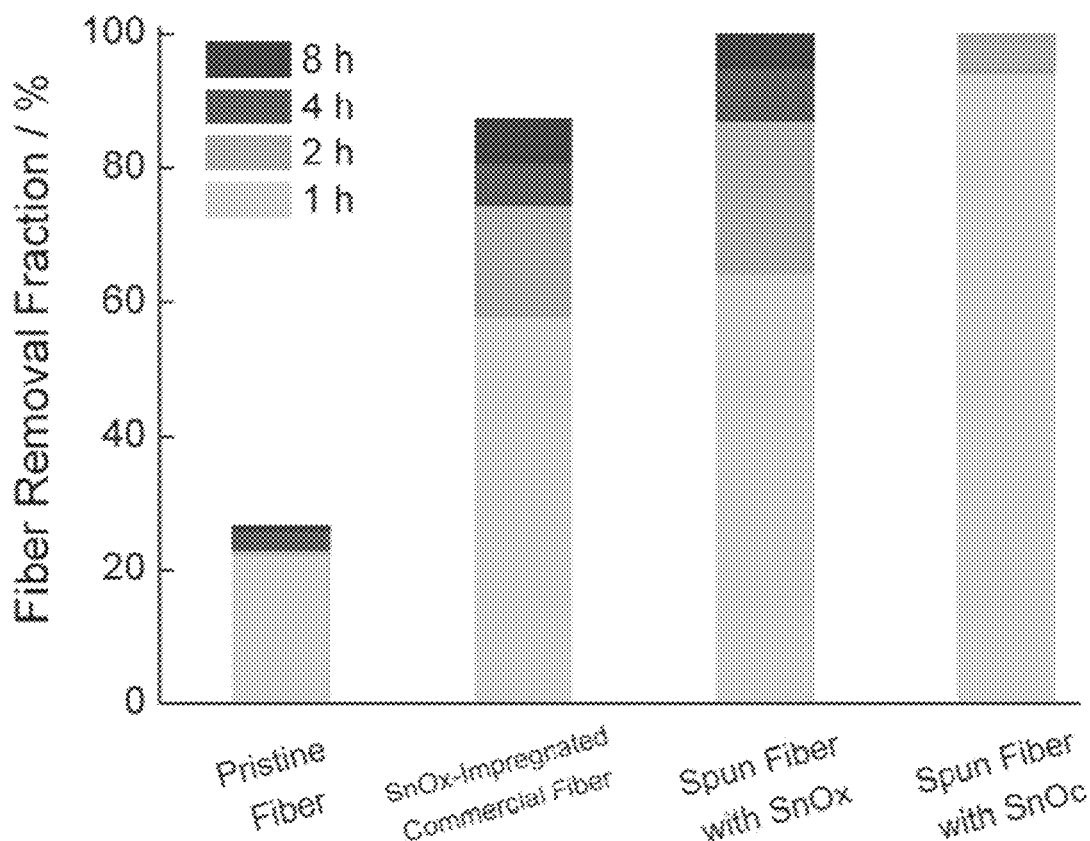
FIG. 26 depicts a graph of fiber removal fraction (%) for the fibers listed in FIG. 25.

FIG. 26 shows the fiber removal fraction data for the different fibers at several times. The spun fibers containing SnOc started to vaporize inside the epoxy matrix almost immediately after exposure to high temperature. These SnOc-containing spun fibers were the first ones to be fully removed, with all fibers reaching complete removal within 2 h. Spun fibers containing SnOx showed a removal fraction of 87.3% after 2 h, and gradually reached complete removal after 8 h. SnOx-infused PLA fibers showed lower fiber removal fraction than these two spun fibers, and instead reached an average fiber removal fraction of 87% after 8 h. Pure PLA fibers containing no catalyst showed minimal fiber removal during the entire thermal treatment course.

Example 9: Manual Formation of Woven Structure of Fibers

PLA fibers (Teijin Monofilament, Germany) were immersed in a stirred 800 mL solution of TFE:$H_2O$ 60:40 (pbv) containing 16 g SnOx and 0.5 g rhodamine 6G and 50 mL Disperbyk 187 (Byk Chemie). The solution was continuously stirred for 24 h at 37° C. Fibers of increasing diameter required longer periods of catalyst infusion, up to 24 h, in order to achieve sufficient removal.

Figure 27:
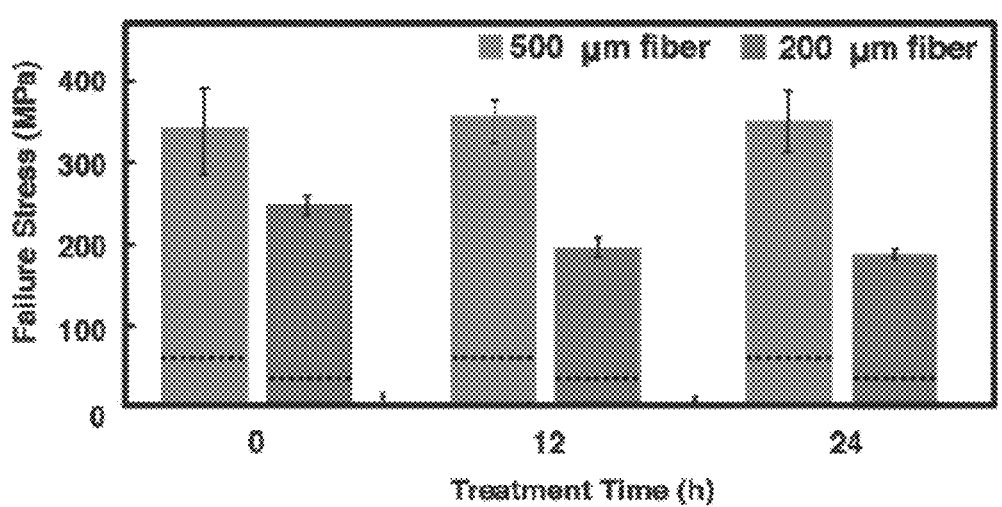
FIG. 27 depicts a graph of average failure stresses for each fiber type and the induced weaving stress for each fiber diameter.

Fibers of diameter 200 micrometers and 500 micrometers were tested in direct tension using an Instron Mini-44 test frame with a load cell capacity of 500 N. A special fixture was designed to hold the fibers straight and precisely aligned with the axis of the test frame. The fibers were loaded using pneumatically controlled grips. The tests were performed in displacement-controlled mode at a constant rate of 5 mm/min until complete fiber failure. Five samples were tested for each 200 and 500 micrometer diameter for both untreated and treated PLA fibers. Two sets of treated fibers were evaluated corresponding to treatment times of 12 h and 24 h. FIG. 27 depicts a graph of average failure stresses for each fiber type and the induced weaving stress for each fiber diameter (dotted lines).

Figure 28:
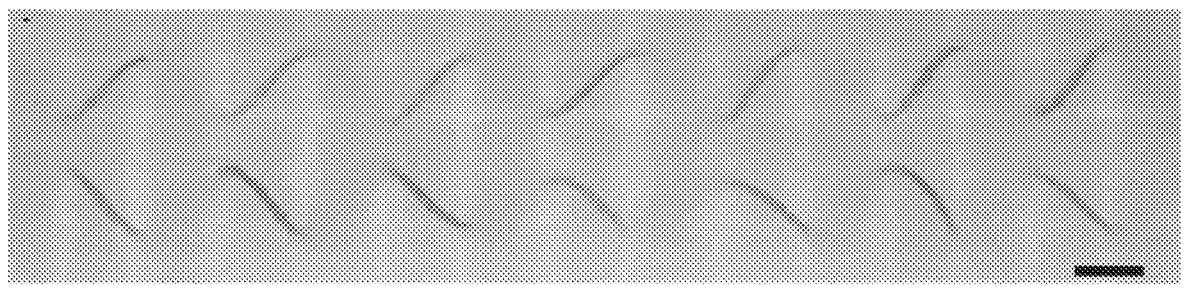
FIG. 28 depicts a micrograph of fiber preforms for 3D composite specimens that were produced by hand-weaving 500 micrometer catalyst treated PLA fibers into a commercially woven E-glass fiber mat.

FIG. 28 depicts a micrograph of fiber preforms for 3D composite specimens that were produced by hand-weaving 500 micrometer catalyst treated PLA fibers into a commercially woven E-glass fiber mat (scale bar: 4 mm). The 3D orthogonal structure consisted of 3 warp and 4 weft/fill layers with Z-tows woven in the warp direction in a repeated, alternating pattern of over 2 then under 2 fill tows. The 3D woven E-glass mat had an overall fabric density of 4070 $g/m^2$ (120 $oz/yd^2$). Catalyst treated PLA fibers (500 micrometers) were then hand-woven into the commercial, 3D woven E-glass fiber mat in a spiraled pattern using a needle to place sacrificial fibers within void spaces of the fabric.

Example 10: Automated Formation of Woven Structure of Fibers

The entire 3D fiber preform including sacrificial PLA fibers was woven by 3TEX, Inc. using an automated 3D weaving machine in a 3WEAVE non-crimp orthogonal pattern. The 3D fiber preform consisted of 2 warp and 3 fill layers of 276 tex (g/km) E-glass roving interwoven with 331 tex S-glass in the z-direction. A portion of the 3D textile, four central rows in the z-direction, was replaced with 500 micrometer diameter sacrificial PLA fibers. Additionally, five layers of a 2D plain weave E-glass fabric (47.5 $g/m^2$)

were then placed above and below the 3D preform to yield roughly 325 micrometers of non-vascular skin surfaces.

Example 11: Formation of Composite Having Woven Structure of Fibers and Microfluidic Channels Both the hand-woven (FIG. 28) and 3TEX automated machine woven (FIGS. 5B, 5D, 5F, 5H) 3D composite specimens were infused with epoxy resin using the Vacuum Assisted Resin Transfer Molding (VARTM) method. The composite layup for VARTM beginning from bottom to top consisted of:
 a. smooth, steel plate covered with Tooltec A012 adhesive backed release tape,
 b. five layers of 2D plain weave E-glass fabric (CST G10800 47.5 g/m$^2$ or 1.4 oz/yd$^2$)
 c. sacrificial PLA fiber 3D woven preform,
 d. five layers of 2D plain weave E-glass fabric (CST G 10800 47.5 g/m$^2$ or 1.4 oz/yd$^2$)
 e. Fibre Glast nylon release peel ply,
 f. Airtech Greenflow 75 low profile distribution media,
 g. 4 mm thick polytetrafluoroethylene (PTFE) plate, and
 h. polyethylene vacuum bagging.

The automated machine woven specimens were infused with an Epon 862/Epikure 3300 resin system mixed at a stoichiometric ratio of 100:24.8 by weight. The hand-woven specimens were infused using an Epon 815C/Epikure 3300 resin system mixed at a stoichiometric ratio of 100:22.7 by weight.

Epon 862 epoxy resin was first degassed for 1 hour before mixing with curing agent Epikure 3300 (100:24.8 pbw), and then again degassed for 45 minutes. Vacuum was applied at 724 torr using a vacuum pump (Welch® DryFast Tuneable Chemical-Duty Vacuum Pump—model 2032B-01) to infiltrate the 3D fiber preform with resin. Once the entire fiber preform was saturated with resin, the inlet line was clamped shut while the vacuum continued to run for at least 16 h during room temperature curing of the 3D composite. The post-cure cycle for both resin systems consisted 1.5 h at 82° C. and 1.5 h at 150° C. in a programmable oven (Thermo Scientific Lindberg/Blue M). The 3D woven composite specimens were then demolded, and the ends were cut using a diamond-tipped wet saw to ensure complete exposure of the sacrificial fiber cross-section before the clearing procedure.

Cured epoxy samples containing sacrificial fiber were placed into a sealed vacuum oven (Fisher Isotemp 283) at 200° C. for 48 h under vacuum (1 torr). Afterwards, samples were cooled to ambient temperature under vacuum before exposing them to atmospheric conditions. If the procedure occurs without vacuum, the channels clear, but the epoxy turns from colorless to brown, most likely the result of oxidation from entrapped oxygen in the composite. With vacuum applied, the color change is much less severe and samples are typically amber or golden brown after the clearing procedure.

Example 12: Analysis of Composite Having Woven Structure of Fibers and Microfluidic Channels The pressure drop ($\Delta P$) calculations were performed using the well-established Hagen-Poiseuille relation:

$$\Delta P = \frac{128 \mu L}{\pi d^4} Q.$$

Here, $\mu$ denotes the dynamic viscosity of the fluid, L and d signify the channel length and diameter, respectively, and Q represents the volumetric flow rate.

The above relation assumes that the flow is laminar viscous and incompressible, which occurs through a straight channel of constant circular cross-section whose length is substantially larger than its diameter. Based upon measurements taken from optimal microscopy, the four 500 micrometer microchannel profiles in the thickness direction were closely approximated by trigonometric functions of the form:

$$z_{1,3}(x)=A_0 \sin(\psi x) z_{2,4}(x)=A_0 \cos(\psi x).$$

Here, x is the coordinate along the length axis; $A_0$ denotes the amplitude; and $\psi$ represents the wavenumber calculated by $\psi=2\pi/\lambda$, where $\lambda$ is the wavelength. Using the integral arc-length formula, a composite specimen 42 mm long, was calculated to have a single microchannel length of about 76 mm for both the sine and cosine counterparts.

Figure 29:
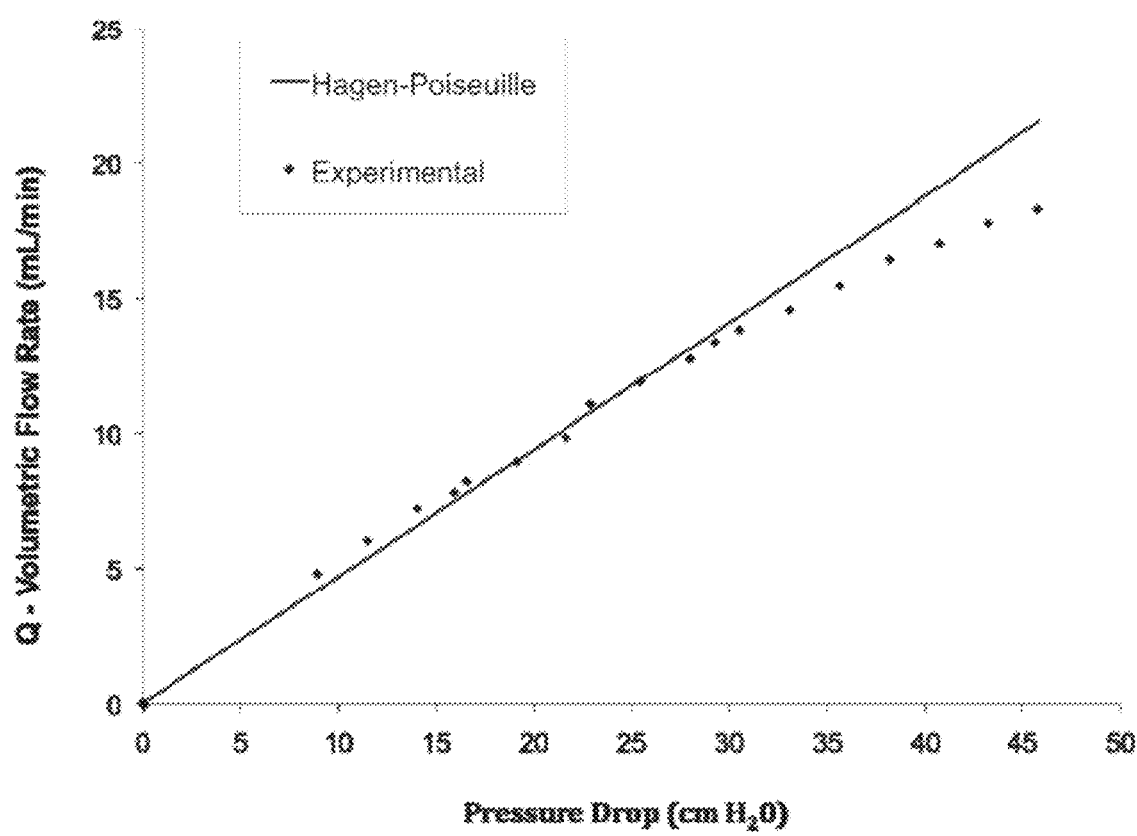
FIG. 29 depicts a graph of volumetric flow rate versus pressure drop for microchannels in a composite.

Various pressure heads were applied using a large basin of $H_2O$, so that the decrease in height resulting from fluid flowing through the channels was negligible. Taking the dynamic viscosity of water at 20° C. to be 1.002 cP, the calculated pressure drop through the four microchannels was compared with the applied pressure head as shown in the graph of FIG. 29. At lower flow rates (<13.5 mL/min), there is excellent agreement between the experimental results and Hagen-Poiseuille relation indicating complete channel evacuation. However at higher volumetric flow rates (>14.5 mL/min), a deviation from the theoretically predicted response occurs where small channel imperfections could lead to increased flow resistance.

Example 13: Dynamic Mechanical Analysis of Composite Having Woven Structure of Fibers and Microfluidic Channels DMA testing was performed on TA Instruments RSA III equipment using a three point bending fixture. A linear heating rate of 3° C./min was applied from 25-200° C. The material response was monitored at a constant frequency of 1 Hz. The storage modulus and tangent $\delta$ were calculated for the given temperature range. The tests were performed on neat epoxy specimens (Epon 828/Epikure 3300) cured using the manufacturer recommended curing cycle (1.5 h at 82° C. and 1.5 h at 150° C.) and on samples post-cured at 200° C. for 48 h to investigate the effect of prolonged heating. The dynamic mechanical properties are listed in Table 2. The error listed represents the standard deviation obtained from five samples.

TABLE 2

Dynamic mechanical properties of composites

| Material | Curing Cycle | Storage Modulus (E', GPa) | Glass Trans. Temp. (Tg, ° C.) |
|---|---|---|---|
| Epon 828/Epikure 3300 | 1.5 h @ 82° C. 1.5 h @ 150° C. | 2.7 ± 0.3 | 132 ± 0.6 |
| Epon 828/Epikure 3300 | 1.5 h @ 82° C. 1.5 h @ 150° C. 48 h @ 200° C. | 2.2 ± 0.001 | 139 ± 0.2 |

Example 14: Active Cooling Using Composite Having Woven Structure of Fibers and Microfluidic Channels Active cooling measurements were accomplished using infrared imaging of the top face of the 3D-microvascular composite. The bottom face of the composite was placed on a copper plate subjected to a constant temperature boundary condition. A thin layer of thermally conductive grease (OmegaTherm) was applied to the bottom face of the composite to eliminate contact problems and create a thermally conductive interface between the copper plate and the composite. A resistive heater was attached to the copper plate (Watlow 120V, 200 W) and controlled with a Watlow Series 942 microprocessor to maintain the copper plate temperature. A feedback control thermocouple was placed on the top of the plate to monitor the temperature of the plate throughout the experiment.

Infrared images were taken using a DeltaTherm 1560 infrared camera with 320 by 256 array of indium antimonids IR detectors. Data was recorded at one frame per second using DeltaVision software. Each data set contained a 2D temperature field of the specimen surface. A region was selected, as shown by the white lined box on the IR image, to average the temperatures of the pixels within this region. The change in temperature within this region was monitored to find the active cooling performance of this composite. The coolant of choice was water, which was pumped through the microchannels at a flow rate of 10 ml/min. The coolant was introduced into the sample at room temperature (21° C.) at a constant flow rate maintained using screw driven syringe pump (KD scientific, Model 210). Coolant flow through the microchannels of the 3D composite resulted in a temperature drop of about 40° C. in 60 seconds.

Example 15: Magneto-Optical Imaging Using Composites Having Woven Structure of Fibers and Microfluidic Channels Field maps around the 3D woven capillary manifold, which was filled with a FerroTec® ferrofluid, were imaged using a magneto-optical imaging technique. A bismuth-substituted yttrium iron garnet (Bi-YIG) indicator film was placed on the top surface of the sample and an external magnetic field H=100 Oe (7960 A/m) was applied perpendicular to the indicator plane to align the magnetic moments of the nanoparticles in the ferrofluid. FIG. 30 depicts a schematic illustration of an inhomogeneous magnetic flux emanating from a 3D microvascular composite due to the alignment of individual nanoparticles suspended in bulk ferrofluid that is contained within sinusoidal channels.

The resulting inhomogeneous magnetic flux modulated by the average magnetic moments in the capillaries was imaged using a Zeiss polarized light microscope. The stronger field from the segment of capillaries closest to the indicator film caused a larger Faraday rotation in the garnet and was observed as a local increase of intensity. Intensity versus field calibration allowed us to measure the local field strength yielding approximately 7 Oe (~560 A/m) increase of H, as indicated by the bright spots in FIG. 13.

Example 16: Chemiluminescence Using Composites Having Woven Structure of Fibers and Microfluidic Channels Commercially available Coleman Illumisticks® containing a chemiluminescent system, were judiciously opened and the two components: a reactive dye solution and an activator solution were separated and stored in glass vials. An interconnected Y-shaped channel was created by wrapping two 500 micrometer fibers around one another for two-thirds of the length, where at one end they were separated by an angle of 45°. The channel geometry was maintained by holding the fibers under tension in an RTV Silicon mold. The fibers were cast in solid resin (Epon 862, Epikure 3300) and cleared leaving behind a mixing channel with two open ports at one end merging into a single inter-connected channel. FIGS. 31A-31E depict micrographs of a vascularized construct of two intertwined fibers forming a Y-shape. In FIG. 31B, each channel was filled with one component of a chemiluminescent solution. In FIG. 31C, chemical reaction is detected at the mixing head indicated by chemiluminescence. In FIG. 31D, the reaction continued down the central channel as the two fluids were continuously pumped. In FIG. 31E, the reaction chemicals exited the channel as mixing was completed.

In the top channel, a syringe containing the dye solution was connected via a 25-G needle and in the lower channel a syringe containing the activator solution was introduced. The two were mixed by continuous addition from each syringe driving liquid into the central mixing channel. As mixing occurred, chemiluminescence was detected in the central portion and continued until the end of the channel indicating the microvascular networks can be used to induce chemical reactivity.

Example 17: Electrical Conductivity in Composites Having Woven Structure of Fibers and Microfluidic Channels The 3D microvascular composite specimen was placed in an electrical circuit in series with an ammeter and a DC power supply unit with current and voltage control options. A voltmeter was placed in parallel to the composite specimen that acts as the resistor in the circuit. Both voltage and current were varied using the DC power supply in order to calculate the resistance of the composite, with and without a conductive phase in the microchannels. Each measurement was repeated three times and the averages have been reported. Initial measurements were made on the composite with empty microchannels. The glass fiber composite served as a non-conductive resistor with a measured resistivity of about $10^4$ $\Omega$-cm (Conductivity: $10^{-4}$ S/cm). The microchannels were then filled with a liquid, eutectic Gallium-Indium alloy and electrical wires were embedded in the liquid alloy followed by solidification process using cooling. Measurements were made for the current flow through a single channel and it was observed to be highly conductive with an electrical conductivity of 4000 S/cm.

Figure 32A:
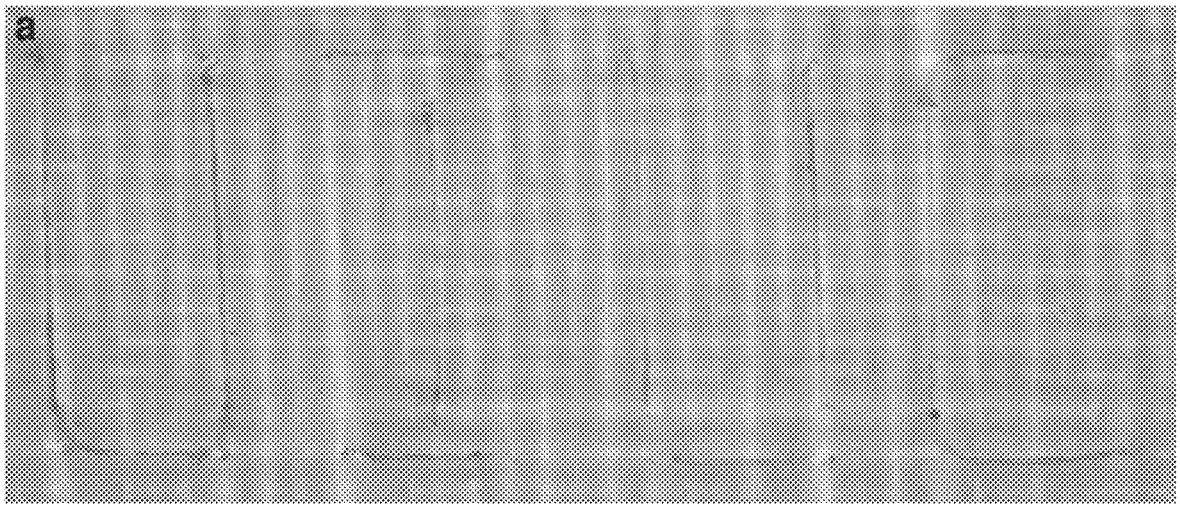
FIGS. 32A and 32B depict micrographs of a composite containing a vascularized channel extending over 0.5 meters in length.
Figure 32B:
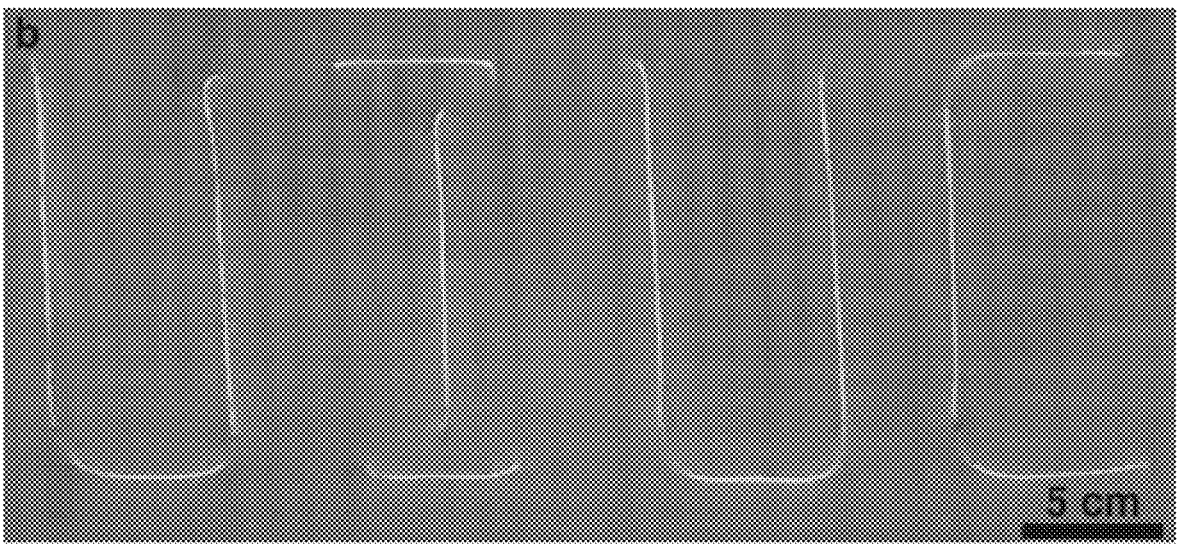

Example 18: Large-Scale Composite Having Woven Structure of Fibers and Microfluidic Channels A single fiber measuring just over 0.5 meters in length was woven through a 3D glass fabric preform using hand-weaving process. The VARTM process was used to infuse the 3D preform with epoxy resin (EPON 862, EPIKURE 3300). The composite was subjected to VaSC process as described in earlier sections for fiber evacuation. FIGS. 27A and 27B depict micrographs of a composite containing a vascularized channel extending over 0.5 meters in length. The empty channel (FIG. 32A) spelled out "UIUC" when viewed from above. The microvascular network was filled with a pre-mixed chemiluminescent solution using a glass syringe equipped with a 25-G needle. The image of FIG. 32B was then captured using low-lighting condition and long exposure time (0.4 s).

While various embodiments of the invention have been described, it will be apparent to those of ordinary skill in the art that other embodiments and implementations are possible within the scope of the invention. Accordingly, the invention is not to be restricted except in light of the attached claims and their equivalents.

What is claimed is:

1. A method of making a microvascular system, comprising:
   forming a composite comprising:
      a solid polymeric matrix, and
      a plurality of sacrificial fibers having a degradation temperature of from 180 to 250° C. in the polymeric matrix;
         where the sacrificial fibers comprise a poly(hydroxyalkanoate) and at least 0.1 wt % of a metal compound selected from the group consisting of a tin salt of a mono- or di-carboxylic acid, and scandium triflate (Sc(OTf)$_3$);
   heating the composite to a temperature of from 100 to 250° C.;
   maintaining the composite at a temperature of from 180 to 250° C. for a time sufficient to form degradants from the sacrificial fibers; and
   removing the degradants from the composite to provide the microvascular system.

2. The method of claim 1, where the forming of the composite comprises:
   contacting the sacrificial fibers with a non-solid polymeric matrix precursor; and
   solidifying the polymeric matrix precursor to form the composite comprising the sacrificial fibers in the solid polymeric matrix.

3. A method of making a microvascular system, comprising:
   forming a composite comprising:
      a solid polymeric matrix, and
      a woven structure in the polymeric matrix, the woven structure comprising a plurality of reinforcing fibers, and a plurality of sacrificial fibers having a degradation temperature of from 180 to 250° C.;
   where the sacrificial fibers comprise a poly(hydroxyalkanoate) and at least 0.1 wt % of a metal compound selected from the group consisting of a tin salt of a mono- or di-carboxylic acid, and scandium triflate (Sc(OTf)$_3$);
   heating the composite to a temperature of from 100 to 250° C.;
   maintaining the composite at a temperature of from 180 to 250° C. for a time sufficient to form degradants from the sacrificial fibers; and
   removing the degradants from the composite to provide the microvascular system.

4. The method of claim 3, where the woven structure comprises warp threads and weft threads in two dimensions, and at least a portion of the sacrificial fibers are present as weft threads.

5. The method of claim 3, where the woven structure comprises warp threads, weft threads and Z-threads in three dimensions, and at least a portion of the sacrificial fibers are present as weft threads or Z-threads.

6. The method of claim 3, where the forming of the composite comprises:
   contacting the sacrificial fibers with a non-solid polymeric matrix precursor; and
   solidifying the polymeric matrix precursor to form the composite comprising the woven structure in the solid polymeric matrix.

7. The method of claim 3, where at least a portion of the microvascular system comprises interconnected microfluidic channels.

8. The method of claim 1, where the sacrificial fibers have a degradation temperature of at most 220° C.

9. The method of claim 1, where the sacrificial fibers have a degradation temperature of at most 180° C.

10. A method of making a degradable polymeric fiber, comprising:
    combining:
       a fiber comprising a poly(hydroxyalkanoate), and
       a composition comprising a fluorinated fluid and a metal compound selected from the group consisting of a tin salt of a mono- or di-carboxylic acid, and scandium triflate (Sc(OTf)$_3$);
    maintaining the fiber and the composition together at a suitable temperature and for a time sufficient to provide a concentration of the metal compound in the fiber of at least 0.1 wt %; and
    separating the fiber from the fluorinated fluid to form the degradable polymeric fiber having a degradation temperature of from 180 to 250° C.

11. The method of claim 10, where the poly(hydroxyalkanoate) comprises poly(lactic acid) (PLA).

12. The method of claim 10, where the tin salt of a mono- or di-carboxylic acid comprises tin(II) acetate, tin(II) oxalate or tin(II) octoate.

13. The method of claim 10, further comprising cold-drawing the degradable polymeric fiber.

14. The method of claim 1, where the metal compound has been incorporated in the sacrificial fibers by a process comprising infusion, liquid spinning, or melt spinning.

15. The method of claim 3, where the metal compound has been incorporated in the sacrificial fibers by a process comprising infusion, liquid spinning, or melt spinning.

16. The method of claim 1, where the metal compound has a concentration of at least 1 wt %.

17. A microvascular system prepared by the method of claim 1.

18. A microvascular system prepared by the method of claim 3.

19. The method of claim 1, where the poly(hydroxyalkanoate) comprises poly(lactic acid) (PLA).

20. The method of claim 3, where the poly(hydroxyalkanoate) comprises poly(lactic acid) (PLA).

* * * * *